US012676395B2

(12) United States Patent
Lu et al.

(10) Patent No.: US 12,676,395 B2
(45) Date of Patent: Jul. 7, 2026

(54) WAVEGUIDE CONVERSION DEVICE AND ELECTRONIC APPARATUS

(71) Applicants: Beijing BOE Sensor Technology Co., Ltd., Beijing (CN); BOE TECHNOLOGY GROUP CO., LTD., Beijing (CN)

(72) Inventors: Yan Lu, Beijing (CN); Haocheng Jia, Beijing (CN); Yan Wang, Beijing (CN); Di Cao, Beijing (CN); Guodong Feng, Beijing (CN); Zhifeng Zhang, Beijing (CN)

(73) Assignees: Beijing BOE Sensor Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 366 days.

(21) Appl. No.: 18/020,962

(22) PCT Filed: Feb. 28, 2022

(86) PCT No.: PCT/CN2022/078463

§ 371 (c)(1),
(2) Date: Feb. 13, 2023

(87) PCT Pub. No.: WO2023/159627

PCT Pub. Date: Aug. 31, 2023

(65) Prior Publication Data

US 2024/0266703 A1 Aug. 8, 2024

(51) Int. Cl.
*H01P 1/16* (2006.01)
*H01P 3/08* (2006.01)

(52) U.S. Cl.
CPC . *H01P 1/16* (2013.01); *H01P 3/08* (2013.01)

(58) Field of Classification Search
CPC .................................... H01P 1/16; H01P 3/08
See application file for complete search history.

(56) References Cited

U.S. PATENT DOCUMENTS 5,867,073 A 2/1999 Weinreb et al.
5,912,598 A 6/1999 Stones et al.
(Continued)

FOREIGN PATENT DOCUMENTS

CN 101217217 A 7/2008
CN 101496279 A 7/2009
(Continued)

*Primary Examiner* — Samuel S Outten
(74) *Attorney, Agent, or Firm* — HOUTTEMAN LAW LLC

(57) ABSTRACT

A waveguide conversion device includes: a waveguide chamber including a waveguide transmission chamber and a waveguide back chamber opposite to each other; a substrate between the waveguide transmission chamber and the waveguide back chamber and at least including a dielectric substrate; a probe in the waveguide chamber and connected to a probe conductive line; and a mode conversion component on the dielectric substrate and including a belt shaped line, first and second ground electrodes. The Probe, the probe conductive line and the belt shaped line are connected in sequence, and the probe and the probe conductive line extend into the waveguide transmission chamber. The belt shaped line is between first and second ground electrodes at an interval, and the belt shaped line has one end connected to the probe conductive line, and the other end connected to a coplanar waveguide transmission line.

17 Claims, 10 Drawing Sheets

(56) References Cited

U.S. PATENT DOCUMENTS

| | | | | |
|---|---|---|---|---|
| 2008/0129409 | A1* | 6/2008 | Nagaishi | H01P 5/107<br>333/34 |
| 2009/0195459 | A1* | 8/2009 | Chua | H01Q 9/04<br>343/700 MS |
| 2010/0117909 | A1* | 5/2010 | DeJean | H01Q 21/30<br>343/702 |
| 2016/0126610 | A1 | 5/2016 | Kawamura | |
| 2019/0214699 | A1* | 7/2019 | Eberhardt | H01Q 13/06 |
| 2020/0006850 | A1* | 1/2020 | Filatov | H01Q 9/42 |
| 2020/0303802 | A1* | 9/2020 | Hsiao | H01P 3/16 |
| 2020/0411986 | A1* | 12/2020 | Cooper | H01Q 9/0421 |
| 2022/0059916 | A1* | 2/2022 | Hashimoto | H01Q 13/106 |

FOREIGN PATENT DOCUMENTS

| | | | |
|---|---|---|---|
| CN | 102623781 | A | 8/2012 |
| CN | 203660030 | U | 6/2014 |
| CN | 107394328 | A | 11/2017 |
| CN | 107394330 | A | 11/2017 |
| CN | 206712002 | U | 12/2017 |
| CN | 112054276 | A | 12/2020 |
| CN | 112615637 | A | 4/2021 |
| CN | 112736394 | A | 4/2021 |
| CN | 215119195 | U | 12/2021 |
| JP | 2015133580 | A | 7/2015 |
| KR | 20190050175 | A | 5/2019 |

* cited by examiner

WAVEGUIDE CONVERSION DEVICE AND ELECTRONIC APPARATUS

CROSS-REFERENCE TO RELATED APPLICATION

This is a National Phase Application filed under 35 U.S.C. 371 as a national stage of PCT/CN2022/078463, filed on Feb. 28, 2022, the contents of which are incorporated herein by reference in their entirety.

TECHNICAL FIELD

The present disclosure belongs to the field of microwave technology, in particular to a waveguide conversion device and an electronic apparatus.

BACKGROUND

Electronic apparatuses are gradually developing toward miniaturization, integration, and multi-function, and waveguide-coplanar transmission line conversion devices become important components of various electronic apparatuses, and the performance of the waveguide-coplanar transmission line conversion devices directly affects the performance of the electronic apparatus.

SUMMARY

The present disclosure is directed to provide a waveguide conversion device and an electronic apparatus.

In a first aspect, the present disclosure provides a waveguide conversion device including: a waveguide chamber including a waveguide transmission chamber and a waveguide back chamber opposite to each other; a substrate between the waveguide transmission chamber and the waveguide back chamber and at least including a dielectric substrate; a probe in the waveguide chamber and connected to a probe conductive line; and a mode conversion component on the dielectric substrate and including a belt shaped line, a first ground electrode and a second ground electrode. The probe, the probe conductive line and the belt shaped line are connected in sequence, and the probe and the probe conductive line extend into the waveguide transmission chamber. The belt shaped line is between and spaced apart from the first ground electrode and the second ground electrode, one end of the belt shaped line is connected to the probe conductive line, and the other end of the belt shaped line is connected to a coplanar waveguide transmission line.

In an embodiment, the probe conductive line and the coplanar waveguide transmission line have different line widths; and the belt shaped line includes at least two belt shaped line segments connected in sequence, and the at least two belt shaped line segments connected in sequence have different line widths.

In an embodiment, the belt shaped line further includes an intermediate belt shaped line segment between a first belt shaped line segment and a second belt shaped line segment, and the intermediate belt shaped line segment has a line width transitioned smoothly or step by step from a width of the first belt shaped line segment to a width of the second belt shaped line segment.

In an embodiment, a position at which the coplanar waveguide transmission line is connected to the belt shaped line overlaps with a waveguide wall of the waveguide chamber.

In an embodiment, an end of the probe is in the waveguide chamber. Alternatively, the end of the probe overlaps with the waveguide wall of the waveguide chamber.

In an embodiment, the probe includes a probe body and a deformation mechanism at an end of the probe body, and the probe body is configured to change a path of current in the probe.

In an embodiment, the deformation mechanism includes at least one through hole, and the through hole penetrates through the probe body in a thickness direction of the probe body. Alternatively, the deformation mechanism includes at least one slit, and the slit extends along a length direction of the probe. Alternatively, the deformation mechanism includes a probe branch, and the probe branch is a part of the probe having an unequal line width along an axis of the probe.

In an embodiment, an axis of the probe and an axis of the belt shaped line intersect or are parallel.

In an embodiment, the probe includes a plurality of sub-probes connected in sequence along an axis of the probe.

In an embodiment, the waveguide conversion device includes n mode conversion components, n being an integer greater than or equal to 2. The belt shaped lines of the n mode conversion components are on a same side of the waveguide chamber, and the probes are oriented in a same direction or different directions. Alternatively, the belt shaped lines of the n mode conversion components are on different sides of the waveguide chamber, and the probes are oriented in a same direction or different directions.

In an embodiment, the probes corresponding to the n mode conversion components are spaced apart, stacked or crossed. Alternatively, ends of the probes corresponding to the n mode conversion components are connected.

In an embodiment, the n mode conversion components are isolated from each other.

In an embodiment, an isolation groove is provided between two adjacent mode conversion components.

In an embodiment, an end of each of the first and second ground electrodes that extends into the waveguide transmission chamber is a flush end.

In an embodiment, an end of each of the first and second ground electrodes that extends into the waveguide transmission chamber is an inclined end, and a side of the inclined end away from the belt shaped line protrudes toward the probe compared with a side of the inclined end close to the belt shaped line.

In an embodiment, an end of each of the first ground electrode and the second ground electrode that extends into the waveguide transmission chamber is provided with a recess on a side away from the belt shaped line.

In an embodiment, an end of each of the first ground electrode and the second ground electrode that extends into the waveguide transmission chamber is an inclined end, and a side of the end away from the belt shaped line protrudes toward the probe compared with a side of the end close to the belt shaped line; and the end is provided with a recess on the side away from the belt shaped line.

In an embodiment, an angle portion, on the side away from the belt shaped line, of the end of each of the first ground electrode and the second ground electrode that extends into the waveguide transmission chamber is an inclined angle portion.

In an embodiment, the substrate further includes a first substrate between the waveguide transmission chamber and the dielectric substrate and a second substrate between the dielectric substrate and the waveguide back chamber.

In an embodiment, the first ground electrode and the second ground electrode are both between the dielectric substrate and the first substrate. Alternatively, the first ground electrode and the second ground electrode are both between the dielectric substrate and the second substrate. Alternatively, the first ground electrode is between the dielectric substrate and the first substrate, and the second ground electrode is between the dielectric substrate and the second substrate.

In an embodiment, a height of the waveguide back chamber is 1 to 2 times a length of the probe.

In an embodiment, the waveguide conversion device further includes a waveguide ridge at a bottom of the waveguide back chamber.

In an embodiment, the waveguide chamber is any one of a rectangular waveguide, a circular waveguide, an elliptical waveguide and a ridge waveguide.

In a second aspect, the present disclosure provides an electronic apparatus including a waveguide conversion device, and the waveguide conversion device is the waveguide conversion device according to the present disclosure.

Reference numbers are:

1—waveguide chamber, 11—waveguide transmission chamber, 12—waveguide back chamber, 121—waveguide ridge, 13—waveguide wall;

2—substrate, 21—dielectric substrate, 22—first substrate, 23—second substrate;

3—probe, 3*a*—first probe, 3*b*—second probe, 3*c*—third probe, 3*d*—fourth probe, 31—probe body, 32—deformation mechanism, 321—slit, 322—through hole, 33—probe conductive line;

4—mode conversion component, 4*a*—first mode conversion component, 4*b*—second mode conversion component, 41—strip line, 41*a*—first belt shaped line segment, 41*b*—second belt shaped line segment, 41*c*—intermediate belt shaped line segment, 42—first ground electrode, 421—first end, 422—first recess, 423—first inclined angle portion, 43—second ground electrode, 431—second end, 432—second recess, 433—second inclined angle portion, 44—isolation groove; and

5—coplanar waveguide transmission line, 5*a*—first coplanar waveguide transmission line, 5*b*—second coplanar waveguide transmission line, 5*c*—third coplanar waveguide transmission line.

DETAIL DESCRIPTION OF EMBODIMENTS

To enable those skilled in the art to better understand the technical solutions of the present disclosure/utility model, the present disclosure/utility model will be further described in detail below with reference to the accompanying drawings and the specific implementations.

Unless defined otherwise, technical or scientific terms used herein shall have their ordinary meanings as understood by one of ordinary skill in the art to which the present disclosure belongs. The term "first," "second," or the like in the present disclosure is not intended to indicate any order, quantity, or importance, but rather is used to distinguish one element from another. Also, the term "a," "an," "the" or the like does not denote a limitation of quantity, but rather denote the presence of at least one. The term "comprise", "include" or the like means that an element or item preceding the word includes an element or item listed after the word and its equivalent, but does not exclude other elements or items. The term "connected", "coupled" or the like is not restricted to physical or mechanical connection, but may include electrical connection, whether direct or indirect. The term "upper", "lower", "left", "right", or the like is used only to indicate relative positional relationship, and when the absolute position of the object being described is changed, the relative positional relationship may also be changed accordingly.

The waveguide conversion device according to embodiments of the present disclosure can be used for realizing conversion from a waveguide to a coplanar waveguide (CPW for short) transmission line, and can also realize conversion from a belt shaped line mode to a CPW mode.

Figure 1:
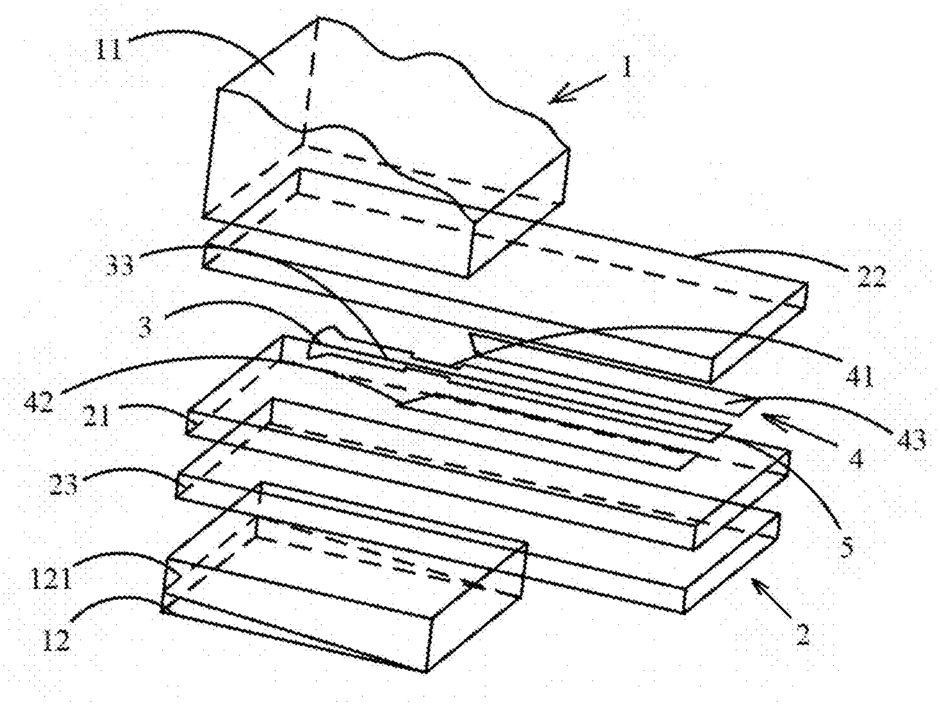
FIG. 1 is a schematic structural diagram of a waveguide conversion device according to an embodiment of the present disclosure.
Figure 2:
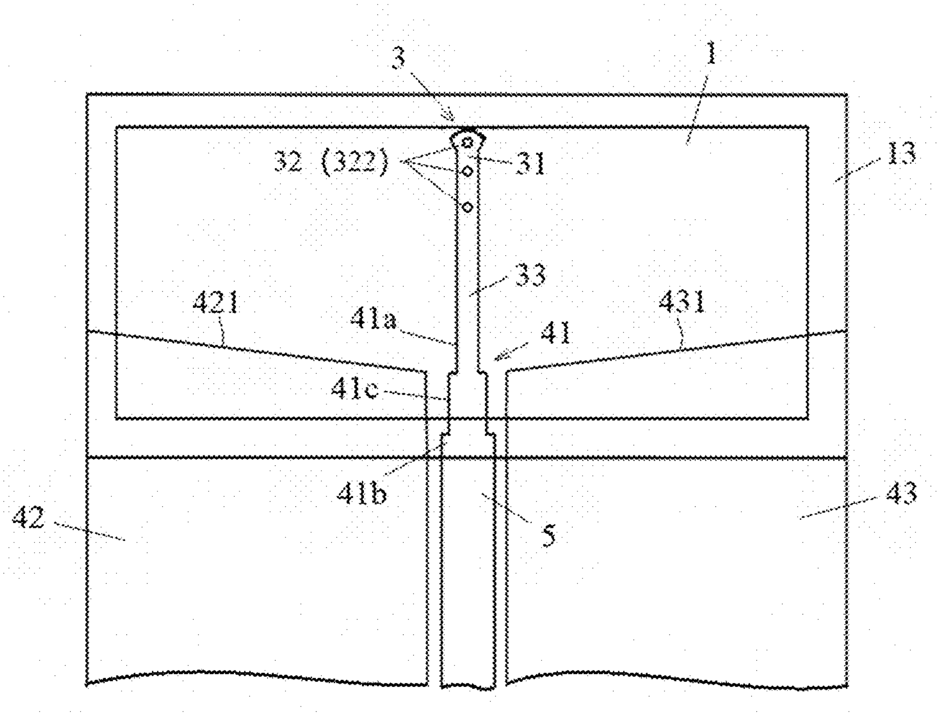
FIG. 2 is a top view of a waveguide conversion device according to an embodiment of the present disclosure.

FIG. 1 is a schematic structural diagram of a waveguide conversion device according to an embodiment of the present disclosure. FIG. 2 is a top view of a waveguide conversion device according to an embodiment of the present disclosure. As shown in FIGS. 1 and 2, the waveguide conversion device includes: a waveguide chamber 1, a substrate 2, a probe 3 and a mode conversion component 4.

The waveguide chamber 1 includes a waveguide transmission chamber 11 and a waveguide back chamber 12 opposite to each other, and the waveguide transmission chamber 11 is configured to propagate the fundamental mode in an operation frequency band and restrain electromagnetic wave such that the electromagnetic wave is coupled to the probe 3. The waveguide back chamber 12 is able to reflect the electromagnetic wave to reduce loss of the electromagnetic wave.

In some embodiments, a height (in an up-down direction in FIG. 1) of the waveguide back chamber 12 is not equal to a quarter of the guide wavelength, so as to create a plurality of resonance points, thereby improving bandwidth.

In some embodiments, the height of the waveguide back chamber 12 is 1-2 times the length of the probe, and the waveguide back chamber 12 having this height can ensure the coupling efficiency in the operation frequency while maintaining the resonant frequency points and improving the bandwidth.

In some embodiments, a waveguide ridge 121 is disposed at bottom of the waveguide back chamber 12, and the waveguide ridge 121 is configured to improve the electric field distribution and reduce the loss of the electromagnetic wave. The shape and position of the waveguide ridge 121 are not limited in the embodiments of the present disclosure.

In some embodiments, the waveguide chamber 1 is any one of a rectangular waveguide, a circular waveguide, an elliptical waveguide, a diamond waveguide, and a ridge waveguide. The shapes of the waveguide transmission chamber 11 and the waveguide back chamber 12 are the same as the shape of the waveguide chamber 1. For example, in a case where the shape of the waveguide chamber 1 is a rectangle, the shapes of the waveguide transmission chamber 11 and the waveguide back chamber 12 are also rectangles.

The substrate 2 is disposed between the waveguide transmission chamber 11 and the waveguide back chamber 12, and is configured to carry the probe 3 and the mode conversion component 4, the substrate 2 at least includes a dielectric substrate 21, and the dielectric substrate 21 is a tunable dielectric substrate. In some embodiments, the dielectric substrate 21 is made of a material including one, or a combination, of lithium niobate ($LiNbO_3$), group III-V semiconductor compounds, silicon dioxide ($SiO_2$), SOI (silicon-on-insulator), Polymer, and molecular materials like liquid crystal.

The probe 3 is disposed in the waveguide chamber 1, and the probe 3 is connected to a probe conductive line 33.

In some embodiments, a direction of the probe 3 (a length/extending direction of the probe) is the same as a direction of the strongest electric field of the fundamental mode of the waveguide, so as to reduce waveguide loss.

In some embodiments, an input impedance of the probe 3 is a function of width and length of the probe, height of the waveguide back chamber 12 and frequency, and the variation of the input impedance of the probe 3 with frequency can be reduced by adjusting the width and the length of the probe 3 and the height of the waveguide back chamber 12, that is, the real and imaginary parts of the input impedance are substantially unaffected by frequency. In a case where the size of the width of the waveguide chamber 1 is appropriate, the length of the probe 3 may be set to be nearly one-half of the length of the dielectric substrate. In a case where the size of the width of the waveguide chamber 1 is not appropriate, the length of the probe 3 may be set such that the probe 3 crosses through the waveguide chamber 1.

The mode conversion component 4 is arranged on the dielectric substrate 21 and is configured to realize the conversion from the waveguide to the coplanar waveguide transmission line 5.

As shown in FIGS. 1 and 2, the mode conversion component 4 includes a belt shaped line 41, a first ground electrode 42, and a second ground electrode 43. The probe 3, the probe conductive line 33, and the belt shaped line 41 are connected in sequence, and the probe 3 and the probe conductive line 33 extend into the waveguide transmission chamber 11.

The belt shaped line 41 is disposed between and spaced apart from the first and second ground electrodes 42 and 43. In other words, the first and second ground electrodes 42 and 43 are disposed at two sides of the belt shaped line 41, respectively. One end of the belt shaped line 41 is connected to the probe conductive line 33 and the other end of the belt shaped line 41 is connected to a coplanar waveguide transmission line 5, i.e., the belt shaped line 41 connects the probe conductive line 33 to the coplanar waveguide transmission line 5. That is, the probe 3, the probe conductive line 33, the belt shaped line 41, and the coplanar waveguide transmission line 5 are connected in sequence.

In some embodiments, a line width of the belt shaped line 41 along a length direction (axis) thereof may be constant or vary. By adjusting the line width of the belt shaped line 41, the impedance of the belt shaped line 41 can be adjusted. In an embodiment of the present disclosure, the line width of the belt shaped line 41 is mainly set according to the line widths of the probe conductive line 33 and the coplanar waveguide transmission line 5, and may also be set according to the line widths of the probe conductive line 33 and the coplanar waveguide transmission line 5 as well as the length of the belt shaped line 41, so as to match the impedance of the belt shaped line 41 with the impedance of the coplanar waveguide transmission line 5.

It should be noted that, in the embodiments of the present disclosure, the line widths of the probe conductive line 33, the belt shaped line 41, and the coplanar waveguide transmission line 5 are sizes relative to the lengths (or the extending directions) of the probe conductive line 33, the belt shaped line 41, and the coplanar waveguide transmission line 5, and the line width refers to the width in the direction perpendicular to the length direction of the probe conductive line 33, the belt shaped line 41, and the coplanar waveguide transmission line 5. For example, the line width is the width of the conductive line on the dielectric substrate 21. The line width of the belt shaped line 41 refers to the width of the belt shaped line 41 on the dielectric substrate 21. Similarly, the line width of the coplanar waveguide transmission line 5 refers to the width of the coplanar waveguide transmission line 5 on the dielectric substrate 21. The line width of the probe conductive line 33 refers to the width of the probe conductive line 33 on the dielectric substrate 21. The line width of the probe 3 refers to the width of the probe 3 on the dielectric substrate 21.

In some embodiments, the line width of the probe conductive line 33 and the line width of the coplanar waveguide transmission line 5 are different. For example, the line width of the probe conductive line 33 is greater than the line width of the coplanar waveguide transmission line 5. Alternatively, the line width of the probe conductive line 33 is smaller than the line width of the coplanar waveguide transmission line 5. The following description will be given by taking a case where the line width of the probe conductive line 33 is smaller than the line width of the coplanar waveguide transmission line 5 as an example.

As shown in FIG. 2, the belt shaped line 41 includes at least two belt shaped line segments connected in sequence, and the at least two belt shaped line segments connected in sequence have different line widths.

In some embodiments, a line width of a first belt shaped line segment 41*a* connected to the probe conductive line 33 may be greater than, less than, or equal to the line width of the probe conductive line 33, and a line width of a second belt shaped line segment 41*b* connected to the coplanar waveguide transmission line 5 may be the same as, or different from, the line width of the coplanar waveguide transmission line 5, as long as the line width and the length of the second belt shaped line segment 41*b* are adjusted such that the impedance of the second belt shaped line segment 41*b* is matched with the impedance of the coplanar waveguide transmission line 5.

In an embodiment of the present disclosure, the coplanar waveguide transmission lines 5 and the second belt shaped line segments 41*b* have the same line width, which can enhance alignment tolerance.

The lengths of the first belt shaped line segment 41*a* and the second belt shaped line segment 41*b* and a ratio of the length of the first belt shaped line segment 41*a* to the length of the second belt shaped line segment 41*b* are not limited in the embodiment of the present disclosure. The length of the first belt shaped line segment 41*a* may be longer than the length of the second belt shaped line segment 41*b*, and alternatively, the length of the first belt shaped line segment 41*a* may be shorter than the length of the second belt shaped line segment 41*b*.

Figure 3:
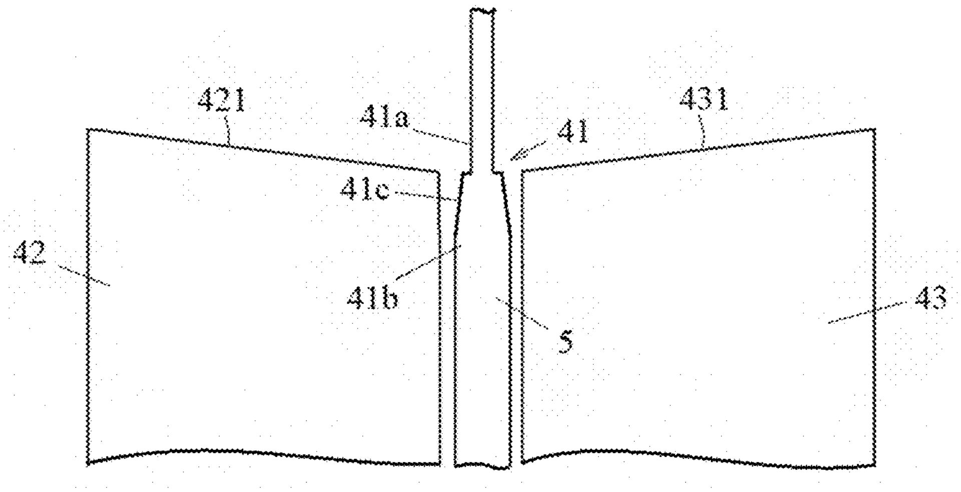
FIG. 3 is a schematic diagram of a mode conversion component according to an embodiment of the present disclosure.

As shown in FIG. 3, an intermediate belt shaped line segment 41*c* is disposed between the first belt shaped line segment 41*a* and the second belt shaped line segment 41*b*, and a line width of the intermediate belt shaped line segment 41*c* smoothly transitions from that of the first belt shaped line segment 41*a* to that of the second belt shaped line segment 41*b*. In some embodiments, the line width of the intermediate belt shaped line segment 41*c* transitions from that of the first belt shaped line segment 41*a* to that of the second belt shaped line segment 41*b* step by step. The belt shaped line 41 may include a plurality of intermediate belt shaped line segments 41*c* connected in sequence, the line widths of the plurality of intermediate belt shaped line segments 41*c* gradually increase from that of the first belt shaped line segment 41*a* to that of the second belt shaped line segment 41*b*, the line width of the intermediate belt shaped line segment 41*c* connected to the first belt shaped line segment 41*a* is greater than that of the first belt shaped line segment 41*a*, and the line width of the intermediate belt shaped line segment 41*c* connected to the second belt shaped line segment 41*b* is less than that of the second belt shaped line segment 41*b*.

In the embodiments of the present disclosure, transition from the probe mode to the coplanar waveguide transmission line mode is achieved by using the probe conductive line 33 and the belt shaped line 41, and impedance match for the two modes is achieved by changing the line width and/or length of the belt shaped line 41.

In the embodiment shown in FIG. 2, the axes of the probe 3, the probe conductive line 33 and the belt shaped line 41 are in a straight line. However, the embodiments of the present disclosure are not limited thereto.

Figure 7:
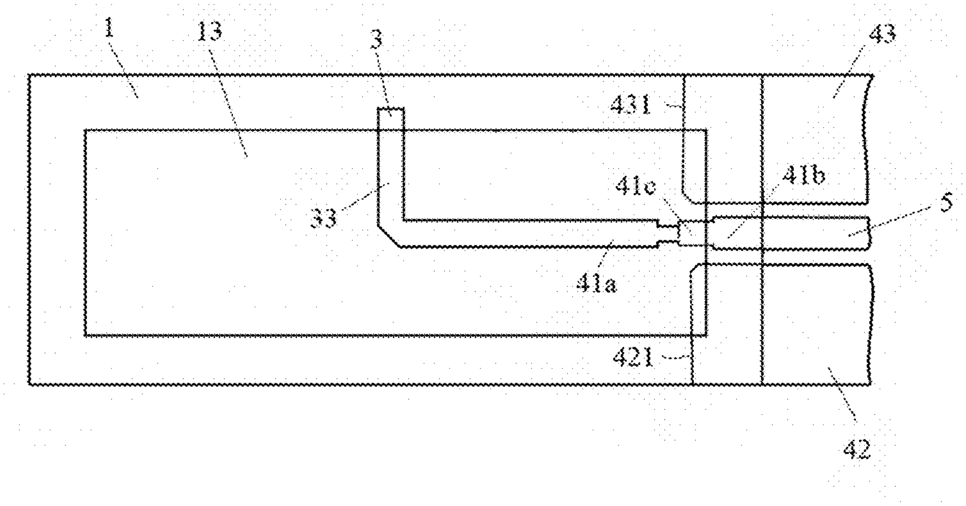
FIG. 7 is a schematic structural diagram of another waveguide conversion device according to an embodiment of the present disclosure.

In some embodiments, the axis of the probe 3 and the axis of the belt shaped line 41 intersect. For example, the axis of the probe 3 and the axis of the probe conductive line 33 intersect, but the axis of the probe conductive line 33 and the axis of the belt shaped line 41 are in a straight line; alternatively, the axis of the probe 3 and the axis of the probe conductive line 33 are in a straight line, but the axis of the probe conductive line 33 and the axis of the belt shaped line 41 intersect; alternatively, the axis of the probe 3 and the axis of the probe conductive line 33 intersect, and the axis of the probe conductive line 33 and the axis of the belt shaped line 41 intersect. As shown in FIG. 7, the axes of the probe 3 and the probe conductive line 33 are perpendicular to each other, and the axes of the probe conductive line 33 and the belt shaped line 41 are in a straight line, so that the axis of the probe 3 and the axis of the belt shaped line 41 are perpendicular to each other.

It should be noted that an angle between the axis of the probe 3 and the axis of the belt shaped line 41 may be set according to circumstances, and is not limited in the embodiments of the present disclosure.

Figure 8:
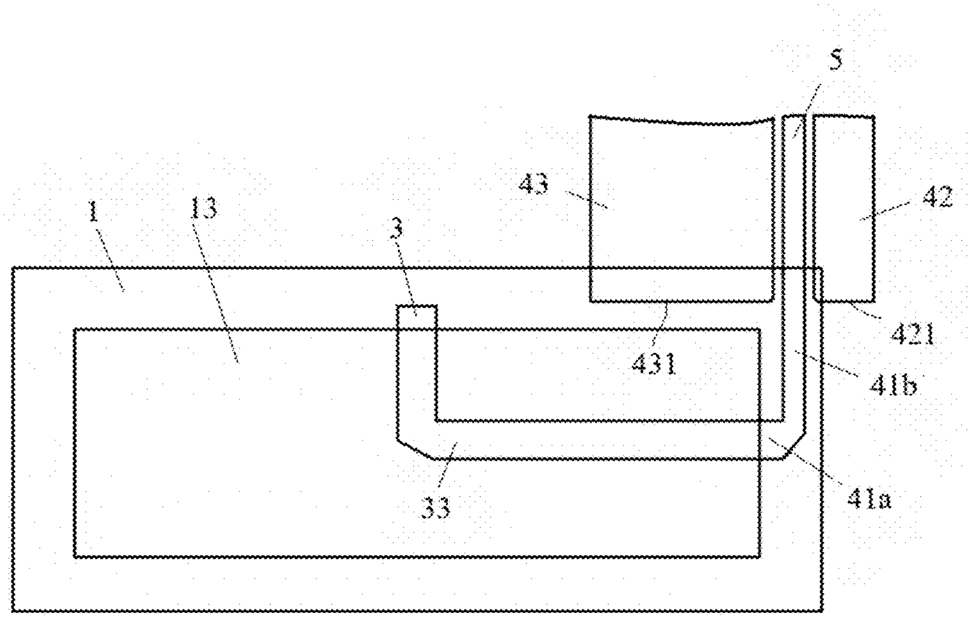
FIG. 8 is a schematic structural diagram of another waveguide conversion device according to an embodiment of the present disclosure.

In some embodiments, the axes of the probe 3 and the belt shaped line 41 are parallel. As shown in FIG. 8, the axis of the probe 3 is perpendicular to the axis of the probe conductive line 33, and the axis of the probe conductive line 33 is perpendicular to the axis of the belt shaped line 41.

In some embodiments, the probe 3 includes a plurality of sub-probes (not shown in the figures) connected in sequence along the axis of the probe. The structure of the sub-probe is the same as that of the probe 3, and the difference is that after the plurality of sub-probes are connected in sequence along the axis of the probe, one of two sub-probes at both ends is connected to the probe conductive line 33, and the remaining sub-probes are not connected to the probe conductive line 33.

As shown in FIG. 2, a connection (bonding) position at which the coplanar waveguide transmission line 5 is connected to the belt shaped line 41 overlaps with a waveguide wall 13 of the waveguide chamber 11, i.e., the connection position at which the coplanar waveguide transmission line 5 is connected to the belt shaped line 41 is located at the waveguide wall 13.

In some embodiments, an end of the probe 3 is disposed in the waveguide chamber 1, i.e., the end of the probe 3 does not contact the waveguide chamber 1 or abuts against the inner wall of the waveguide chamber 1. In some embodiments, the end of the probe 31 overlaps with the waveguide wall 13 of the waveguide chamber 1. The propagation of electromagnetic waves can be implemented by arranging the end of the probe 3 in the waveguide chamber 1 or overlapping the end of the probe 3 with the waveguide wall 13 of the waveguide chamber 1.

As shown in FIG. 2, the probe 3 includes a probe body 31 and a deformation mechanism 32 provided at an end of the probe body 31, and the deformation mechanism 32 is configured to change a path of current in the probe and increase a match bandwidth.

In some embodiments, the deformation mechanism 32 includes a probe branch, which is a portion having a different line width along the axis of the probe 3, for example, along the axis of the probe 3, the line width of a certain portion of the probe 41 becomes wider, and this wider portion refers to the probe branch.

In some embodiments, the width of the probe branch is greater than the width of the probe conductive line 33. The shape of the probe branch may be a fan, a rectangle or other suitable shape, and the shape of the probe branch may also be a combination of a fan and a rectangle, that is, the shape of the probe branch is formed by splicing a fan and a rectangle, but the shape of the probe branch is not limited in the embodiments of the present disclosure. In the embodiments of the present disclosure, the probe branch can change the path of the current in the probe 3, and increase the match bandwidth.

In some embodiments, the width of the probe branch is smaller than the width of the probe conductive line 33.

In some embodiments, the deformation mechanism 32 includes at least one slit, and the slit extends along the length direction of the probe. The number and the length of the at least one slit are not limited in the embodiments of the present disclosure, and the number of the at least one slit may be one, two, or any other number. In the embodiments of the present disclosure, the slit 321 not only can change the path of the current in the probe 3 and increase the match bandwidth, but also can increase resonance points.

Figure 5:
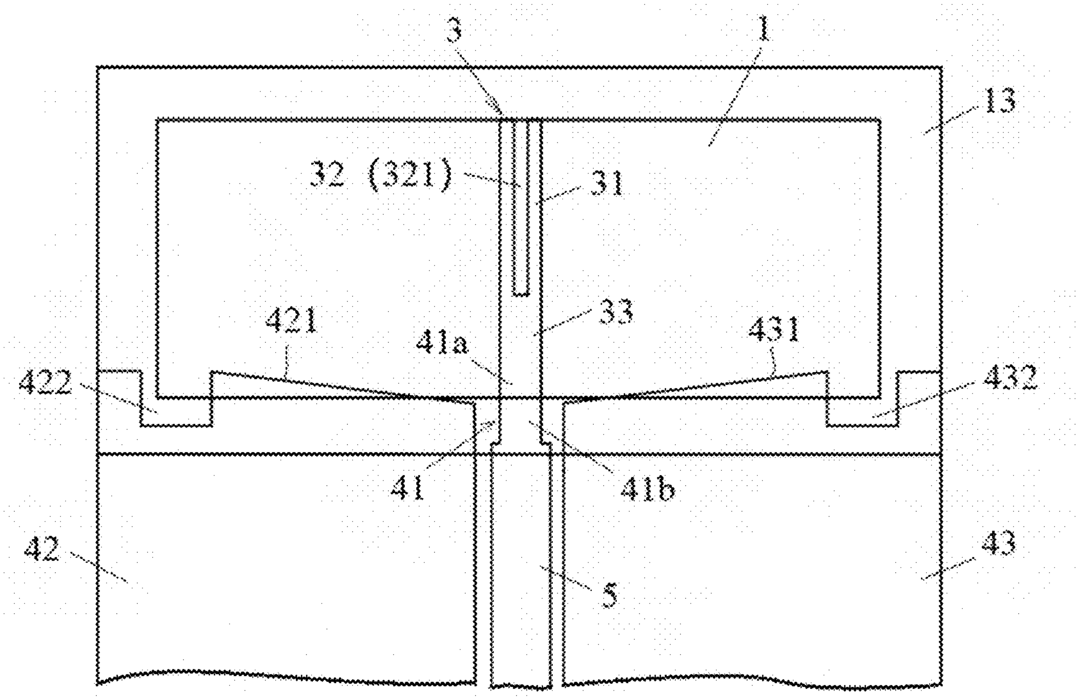
FIG. 5 is a schematic structural diagram of another waveguide conversion device according to an embodiment of the present disclosure.
Figure 6:
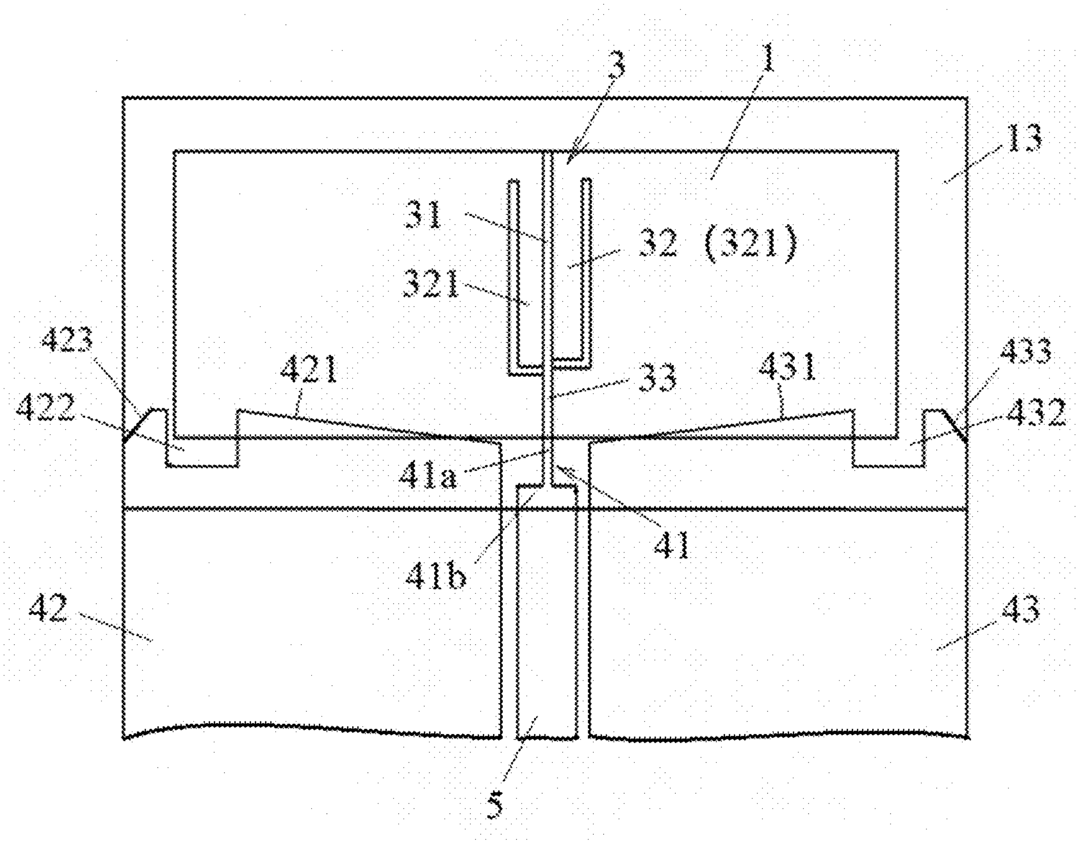
FIG. 6 is a schematic structural diagram of another waveguide conversion device according to an embodiment of the present disclosure.

As shown in FIG. 5, the deformation mechanism 32 includes one slit 321, the slit 321 extends along the length direction of the probe, and the slit 321 causes the end of the probe 3 to have a two-tooth fork shape. As shown in FIG. 6, the deformation mechanism 32 includes two slits 321, and the two slits 321 cause the end of the probe 3 to have a trident shape. In this case, the lengths of the two slits 321 may be the same or different, and the widths of the two slits 321 may be the same or different, which are not limited in the embodiments of the present disclosure.

In some embodiments, in a case where the deformation mechanism 32 includes a slit 321, the end of the probe 3 may be flush (as shown in FIG. 5) or may not be flush (as shown in FIG. 6).

In some embodiments, the deformation mechanism 32 includes at least one through hole, and the through hole penetrates through the probe body 31 in the thickness direction of the probe body 31. As shown in FIG. 2, the deformation mechanism 32 includes three through holes 322, the three through holes 322 are arranged at an interval along the length direction of the probe body 31, and the through holes 322 can change the path of the current in the probe 3 and increase the match bandwidth. It should be noted that, although the case where the deformation mechanism 32 includes three through holes 322 is described in the embodiment of the present disclosure, the number of the through holes 322 is not limited.

In some embodiments, as shown in FIGS. 7 and 8, the first end 421 of the first ground electrode 42 extending into the waveguide transmission chamber 11 is a flush end, i.e., the end face of the first end 421 of the first ground electrode 42 extending into the waveguide transmission chamber 11 is flush. The second end 431 of the second ground electrode 43 extending into the waveguide transmission chamber 11 is flush, that is, the end face of the second end 431 of the second ground electrode 43 extending into the waveguide transmission chamber 11 is flush.

In some embodiments, as shown in FIG. 2, the first end 421 of the first ground electrode 42 extending into the waveguide transmission chamber is an inclined end, that is, the end face of the first end 421 is an inclined surface, and a side of the first end 421 away from the belt shaped line 41 protrudes toward the probe 3 compared with a side of the first end 421 close to the belt shaped line 41. In other words, the first end 421 on a side of the first ground electrode 42 close to the probe 3 extends into the waveguide transmission chamber 11, the first end 421 is an inclined end, and the farther from the belt shaped line 41, the more the first end 421 extends into the waveguide transmission chamber 11.

The second end 431 of the second ground electrode 43 extending into the waveguide transmission chamber is an inclined end, and a side of the second end 431 away from the belt shaped line 41 protrudes toward the probe 3 compared with a side of the second end 431 close to the belt shaped line 41. In other words, the second end 431 on a side of the second ground electrode 43 close to the probe 3 extends into the waveguide transmission chamber 11, the second end 431 is an inclined end, and the farther from the belt shaped line 41, the more the second end 431 extends into the waveguide transmission chamber 11.

In the embodiments of the present disclosure, the inclined end can change the current path in the first ground electrode 42, and reduce the current flow toward the edge of the first ground electrode 42, thereby increasing the match bandwidth. Similarly, the inclined end can change the current path in the second ground electrode 43 and reduce the current flow toward the edge of the second ground electrode 43, thereby increasing the match bandwidth.

Figure 4:
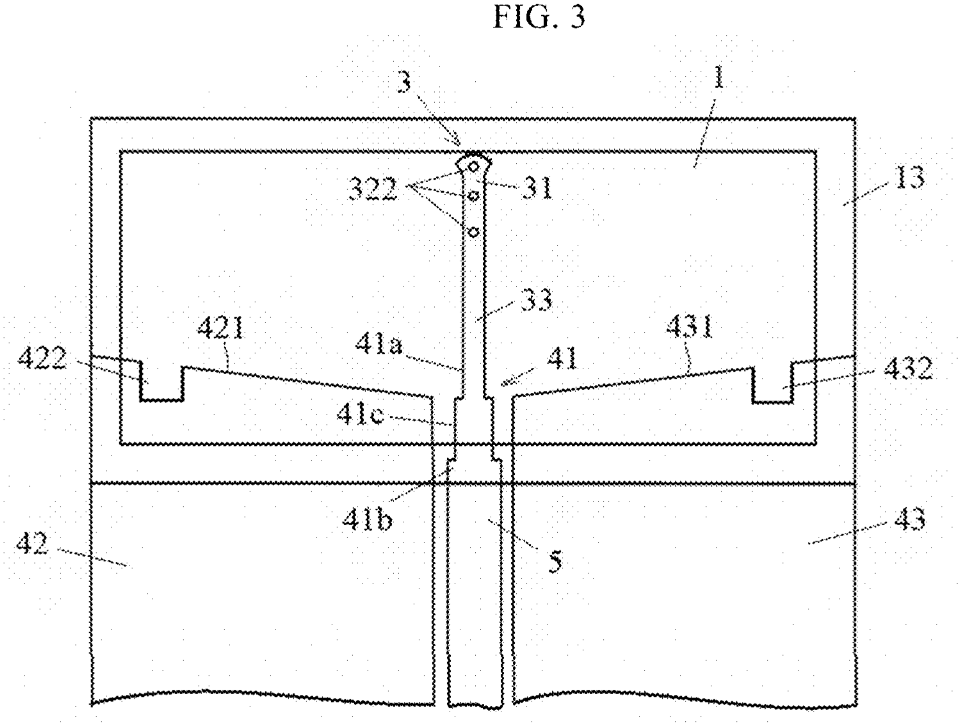
FIG. 4 is a schematic structural diagram of another waveguide conversion device according to an embodiment of the present disclosure.

In some embodiments, as shown in FIG. 4, the first end 421 of the first ground electrode 42 extending into the waveguide transmission chamber 11 is a curved end, that is, the end face of the curved end is a curved surface, and the farther the curved end is from the belt shaped line 41, the greater the radian is. The curved end may further reduce the current flow toward the edge of the first ground electrode 42, thereby increasing the match bandwidth.

The second end 431 of the second ground electrode 43 extending into the waveguide transmission chamber 11 is a curved end, and the farther the curved end is from the belt shaped line 41, the greater the radian is. The curved end may further reduce the current flow toward the edge of the second ground electrode 43, thereby increasing the match bandwidth.

As shown in FIG. 4, the first end 421 of the first ground electrode 42 extending into the waveguide transmission chamber 11 is provided with a first recess 422, and the first recess 422 is located on a side of the first end 421 away from the belt shaped line 41. The first recess 422 can affect electric field distribution, increase the length of the current path flowing to the edge, cause the current at the edge of the first ground electrode 42 to be reflected toward the belt shaped line 41 side, reduce current flow toward the edge of the first ground electrode 42, and thus increase the match bandwidth.

The second end 431 of the second ground electrode 43 extending into the waveguide transmission chamber 11 is provided with a second recess 432, and the second recess 432 is located on a side of the second end 431 away from the belt shaped line 41. The second recess 432 can affect the electric field distribution, increase the length of the current path flowing to the edge, cause the current at the edge of the second ground electrode 43 to be reflected toward the belt shaped line 41 side, reduce the current flow toward the edge of the second ground electrode 43, and thus increase the match bandwidth.

In some embodiments, the ends of the first ground electrode 42 and the second ground electrode 43 extending into the waveguide transmission chamber 11 are both inclined ends, and the side of each end away from the belt shaped line 41 protrudes toward the probe 3 compared with the side of the end close to the belt shaped line 41. Moreover, the end is provided with a recess, and the recess is located on the side of the end away from the belt shaped line.

As shown in FIG. 5, the first end 421 of the first ground electrode 42 extending into the waveguide transmission chamber 11 is an inclined end/curved end, the side of the first end 421 away from the belt shaped line 41 protrudes toward the probe 3 compared with the side of the first end close to the belt shaped line 41, the first end 421 is provided with the first recess 422, and the first recess 422 is located on the side of the first end away from the belt shaped line 41.

The second end 431 of the second ground electrode 43 extending into the waveguide transmission chamber 11 is an inclined end/curved end, the side of the second end 431 away from the belt shaped line 41 protrudes toward the probe 3 compared with the side of the second end 431 close to the belt shaped line 41, the second end 431 is provided with the second recess 432, and the second recess 432 is located on the side of the second end 431 away from the belt shaped line 41.

In the embodiments of the present disclosure, by setting the first end 421 of the first ground electrode 42 extending into the waveguide transmission chamber 11 to be an inclined end, providing the first recess 422 at the first end 421, setting the second end 431 of the second ground electrode 43 extending into the waveguide transmission chamber 11 to be an inclined end, and providing the second recess 432 at the second end 431, the electric field distribution can be further influenced, the length (distance) of the current path flowing to the edge can be increased, the current at the edge can be reflected to the belt shaped line 41 side, and the current flow toward the edge can be reduced, thereby increasing the match bandwidth, compared with the case where only inclined ends or curved ends are provided, or only recesses are provided.

In some embodiments, an angle portion of the end of each of the first ground electrode 42 and the second ground electrode 43 extending into the waveguide transmission chamber 11 and on the side away from the belt shaped line 41 is an inclined angle portion.

As shown in FIG. 6, the first end 421 of the first ground electrode 42 extending into the waveguide transmission chamber 11 is an inclined end, the radian of the first end 421 is larger on the side of the first end away from the belt shaped line 41 than on the side of the first end close to the belt shaped line 41, and the first end 421 is provided with the first recess 422 on the side away from the belt shaped line 41. Moreover, the outermost angle portion of the first end 421 is a first inclined angle portion 423, that is, the outermost angle of the first end 421 is an oblique angle.

The second end 431 of the second ground electrode 43 extending into the waveguide transmission chamber 11 is an inclined end, the radian of the second end 431 is larger on the side of the second end 431 away from the belt shaped line 41 than on the side of the second end 431 close to the belt shaped line 41, and the second end 431 is provided with the second recess 432, and the second recess 422 is located on the side of the second end 431 away from the belt shaped line 41. Moreover, the outermost angle portion of the second end 431 is a second inclined angle portion 432, that is, the outermost angle of the second end 421 is an inclined angle.

It should be noted that the first ground electrode 42 and the second ground electrode 43 respectively located at both sides of the belt shaped line 41 may have the same structure, that is, the first ground electrode 42 and the second ground electrode 43 having the same structure are symmetrically disposed at both sides of the belt shaped line 41. For example, the first end 421 of the first ground electrode 42 extending into the waveguide transmission chamber 11 is a curved end, and the second end 431 of the second ground electrode 43 extending into the waveguide transmission chamber 11 is also a curved end. The structures of the first and second ground electrodes 42 and 43 respectively located at both sides of the belt shaped line 41 may also be different. For example, the first end 421 of the first ground electrode 42 extending into the waveguide transmission chamber 11 is an inclined end provided with the first recess 422, and the second end 431 of the second ground electrode 43 extending into the waveguide transmission chamber 11 is a curved end without the second recess 432.

As shown in FIG. 1, the substrate 2 further includes a first substrate 22 and a second substrate 23, the first substrate 22 is disposed between the waveguide transmission chamber 11 and the dielectric substrate 21, and the second substrate 23 is disposed between the dielectric substrate 21 and the waveguide back chamber 12. In other words, the dielectric substrate 21 is disposed between the first substrate 22 and the second substrate 23.

In some embodiments, the first substrate 22 and the second substrate 23 may be made of glass, or may be made of other suitable materials, and the materials of the first substrate 22 and the second substrate 23 are not limited in the embodiments of the present disclosure.

In an embodiment of the present disclosure, the dielectric substrate 21 includes two carrying surfaces, one carrying surface is adjacent to the first substrate 22, and the other carrying surface is adjacent to the second substrate 23. The first ground electrode 42 and the second ground electrode 43 may be disposed on the same carrying surface of the dielectric substrate 21, or may be disposed on different carrying surfaces of the dielectric substrate 21.

In some embodiments, the first and second ground electrodes 42 and 43 are both disposed between the dielectric substrate 21 and the first substrate 22. For example, the first and second ground electrodes 42 and 43 are both disposed on the carrying surface of the dielectric substrate 21 adjacent to the first substrate 22.

In some embodiments, the first and second ground electrodes 42 and 43 are both disposed between the dielectric substrate 21 and the second substrate 23. For example, the first and second ground electrodes 42 and 43 are both disposed on the carrying surface of the dielectric substrate 21 adjacent to the second substrate 23.

In some embodiments, the first ground electrode 42 is disposed between the dielectric substrate 21 and the first substrate 22, and the second ground electrode 43 is disposed between the dielectric substrate 21 and the second substrate 23.

It should be noted that, the first ground electrode 42 and the second ground electrode 43 may have the same structure and the same size, as shown in FIGS. 1 to 7. Alternatively, the first and second ground electrodes 42 and 43 may be the same in structure but different in size, as shown in FIG. 8.

In the above embodiments, the waveguide conversion device is provided with only one mode conversion component 4, that is, the one-to-one conversion from waveguide to coplanar waveguide transmission line is realized, but the embodiments of the present disclosure are not limited thereto. The waveguide conversion device may be provided with two or more mode conversion components 4 to realize one-to-many conversion from waveguide to coplanar waveguide transmission line.

In some embodiments, the waveguide conversion device includes n mode conversion components 4, n being an integer greater than or equal to 2; the belt shaped lines 41 of the n mode conversion components 4 are disposed on the same side of the waveguide chamber 1, and the probes 3 are oriented in the same direction or different directions. Alternatively, the belt shaped lines 41 of the n mode conversion components 4 are disposed on different sides of the waveguide chamber 1, and the probes are oriented in the same direction or different directions.

Figure 9:
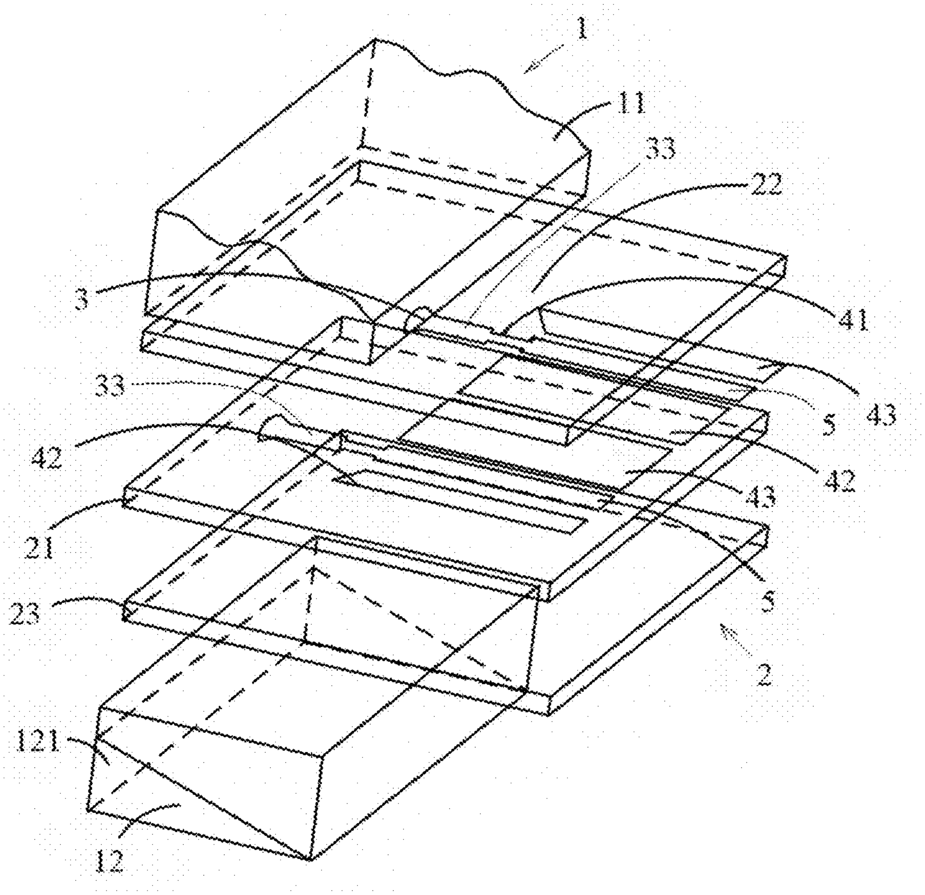
FIG. 9 is a schematic structural diagram of another waveguide conversion device according to an embodiment of the present disclosure.
Figure 10:
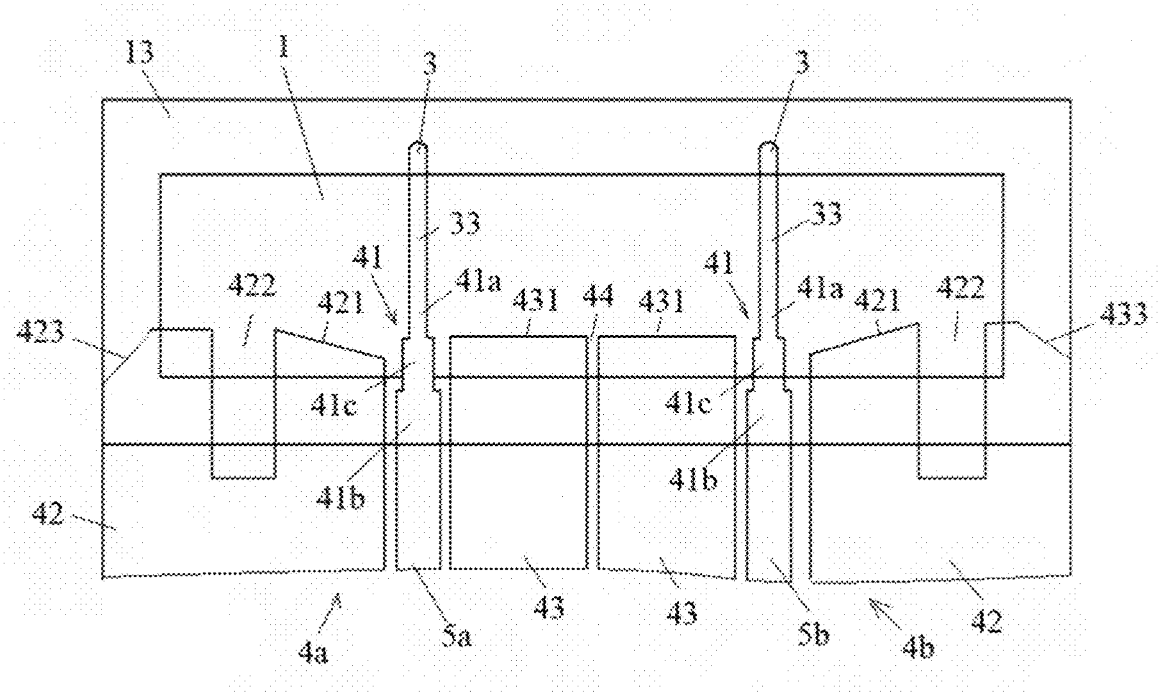
FIG. 10 is a top view of a waveguide conversion device according to an embodiment of the present disclosure.

FIG. 9 is a schematic structural diagram of another waveguide conversion device according to an embodiment of the present disclosure. FIG. 10 is a top view of the waveguide conversion device according to the embodiment of the present disclosure. As shown in FIGS. 9 and 10, the waveguide conversion device includes: a waveguide chamber 1, a substrate 2, two probes 3 and two mode conversion components 4.

The waveguide chamber 1 includes a waveguide transmission chamber 11 and a waveguide back chamber 12 which are opposite to each other, and the waveguide transmission chamber 11 propagates a fundamental mode in an operation frequency band and restrains electromagnetic wave such that the electromagnetic wave is coupled to the probe. The waveguide back chamber 12 is able to reflect the electromagnetic wave to reduce the loss of the electromagnetic wave.

In some embodiments, the height (in an up-down direction in FIG. 9) of the waveguide back chamber 12 is not equal to a quarter of the guide wavelength, so as to create a plurality of resonance points, thereby improving bandwidth. In some embodiments, the height of the waveguide back chamber 12 is 1-2 times the length of the probe, and this height can ensure the coupling efficiency in the operation frequency while maintaining the plurality of resonance frequency points and improving the bandwidth. In some embodiments, a waveguide ridge 121 is disposed at the bottom of the waveguide back chamber 12, and the waveguide ridge 121 is configured to improve the electric field distribution and reduce the loss of the electromagnetic wave. The shape and position of the waveguide ridge 121 are not limited in the embodiments of the present disclosure.

The substrate 2 is disposed between the waveguide transmission chamber 11 and the waveguide back chamber 12, and is configured to carry the probe 3 and the mode conversion component 4, the substrate 2 at least includes a dielectric substrate 21, and the dielectric substrate 21 is a tunable dielectric substrate.

In some embodiments, the substrate 2 further includes a first substrate 22 and a second substrate 23, the first substrate 22 is disposed between the waveguide transmission chamber 11 and the dielectric substrate 21, and the second substrate 23 is disposed between the dielectric substrate 21 and the waveguide back chamber 12, that is, the dielectric substrate 21 is disposed between the first substrate 22 and the second substrate 23.

In an embodiment of the present disclosure, the waveguide conversion device includes a first mode conversion component 4*a* and a second mode conversion component 4*b*, the first mode conversion component 4*a* and the second mode conversion component 4*b* are disposed in parallel on the dielectric substrate 21 and are configured to implement conversion from waveguide to the coplanar waveguide transmission line 5.

In some embodiments, the first mode conversion component 4*a* and the second mode conversion component 4*b* are isolated from each other, for example, by air or other insulating component.

In some embodiments, the first mode conversion component 4*a* and the second mode conversion component 4*b* have the same structure. The first mode conversion component 4*a* will be described below. The first mode conversion component 4*a* includes a probe 3, a probe conductive line 33, a belt shaped line 41, a first ground electrode 42 and a second ground electrode 43, the probe 3, the probe conductive line 33 and the belt shaped line 41 are connected in sequence, and the probe 3 and the probe conductive line 33 extend into the waveguide transmission chamber 11.

The belt shaped line 41 is disposed between and spaced apart from the first ground electrode 42 and the second ground electrode 43, one end of the belt shaped line 41 is connected to the probe conductive line 33 and the other end of the belt shaped line 41 is connected to the coplanar waveguide transmission line 5, i.e., the belt shaped line 41 connects the probe conductive line 33 to the coplanar waveguide transmission line 5. In some embodiments, the probe 3, the probe conductive line 33, the belt shaped line 41, and the coplanar waveguide transmission line 5 are connected in sequence.

In some embodiments, the width and length of the belt shaped line 41 vary to adjust the impedance of the belt shaped line 41. In an embodiment of the present disclosure, the line width of the belt shaped line 41 is mainly set according to the line widths of the probe conductive line 33 and the coplanar waveguide transmission line 5, and may also be set according to the line widths of the probe conductive line 33 and the coplanar waveguide transmission line 5 as well as the length of the belt shaped line 41.

It should be noted that, in the embodiments of the present disclosure, the line widths of the probe conductive line 33, the belt shaped line 41, and the coplanar waveguide transmission line 5 are sizes relative to the lengths (or the extending directions) of the probe conductive line 33, the belt shaped line 41, and the coplanar waveguide transmission line 5, and the line width refers to the width in the direction perpendicular to the length direction of the probe conductive line 33, the belt shaped line 41, and the coplanar waveguide transmission line 5.

In some embodiments, the line widths of the probe conductive line 33 and the coplanar waveguide transmission line 5 are different. For example, the line width of the probe conductive line 33 is larger than that of the coplanar waveguide transmission line 5. Alternatively, the line width of the probe conductive line 33 is smaller than that of the coplanar waveguide transmission line 5. The following description will be given by taking a case where the line width of the probe conductive line 33 is smaller than the line width of the coplanar waveguide transmission line 5 as an example.

In some embodiments, the belt shaped line 41 includes at least two belt shaped line segments connected in sequence, and the at least two belt shaped line segments connected in sequence have different line widths. For example, the line width of a first belt shaped line segment 41*a* connected to the probe conductive line 33 is smaller than or equal to the line width of the probe conductive line 33, and the line width of a second belt shaped line segment 41*b* connected to the coplanar waveguide transmission line 5 is the same as the line width of the coplanar waveguide transmission line 5.

In the embodiments of the present disclosure, the coplanar waveguide transmission lines 5 and the second belt shaped line segments 41*b* have the same line width, which can enhance alignment tolerance.

As shown in FIG. 10, an intermediate belt shaped line segment 41*c* is disposed between the first belt shaped line segment 41*a* and the second belt shaped line segment 41*b*, and the line widths of the first belt shaped line segment 41*a*, the intermediate belt shaped line segment 41*c*, and the second belt shaped line segment 41*b* are increased step by step, that is, the line width of the first belt shaped line segment 41*a* is smaller than that of the intermediate belt shaped line segment 41*c*, and the line width of the intermediate belt shaped line segment 41*c* is smaller than that of the second belt shaped line segment 41*b*.

It should be noted that step-by-step transition of the line width of the belt shaped line 41 is only one way to achieve impedance match, and the belt shaped line 41 in the embodiment of the present disclosure may also be in smooth transition to achieve impedance match between the belt shaped line 41 and the coplanar waveguide transmission line 5.

In some embodiments, the axes of the probe 3, the probe conductive line 33, and the belt shaped line 41 are in a straight line. The position at which the belt shaped line 41 is bonded with the coplanar waveguide transmission line 5 is located at the waveguide wall 13 of the waveguide chamber 11, i.e., the end of the coplanar waveguide transmission line 5 connected to the belt shaped line 41 is located at the waveguide wall 13.

In some embodiments, the ends of the probes 3 corresponding to the first mode conversion component 4*a* and the second mode conversion component 4*b* both overlap with the waveguide wall 13 of the waveguide chamber 1, i.e., the ends of the probes 3 are directly opposite to the waveguide wall 13 of the waveguide chamber 1.

It should be noted that, although the end of the probe is not provided with the deformation mechanism in this embodiment of the present disclosure, this does not mean that the end of the probe cannot be provided with the deformation mechanism when the waveguide conversion device includes a plurality of mode conversion components. Furthermore, the deformation mechanism may be in the form of a probe branch, a slit, a through hole, or the like. The specific form of the deformation mechanism may refer to those in the one-to-one mode conversion device from waveguide to coplanar waveguide transmission line as described above, and details are not repeated here.

In some embodiments, the first end 421 of the first ground electrode 42 of the first mode conversion component 4*a* extending into the waveguide chamber 1 is a curved end, that is, the end face of the first end 421 is a curved surface, so as to improve the current path of the first ground electrode 42, which is beneficial for increasing the match bandwidth. In addition, a side of the first end 421 away from the belt shaped line 41 protrudes toward the probe 3 compared to a side of the first end 421 close to the belt shaped line 41. In addition, the first recess 422 is provided at the side of the first end 421 of the first ground electrode 42 away from the belt shaped line 41, and the first recess 422 affects the electric field distribution, increases the length of the current path flowing to the edge, causes the current at the edge of the first ground electrode 42 to be reflected toward the belt shaped line 41 side, and reduces the current flowing to the edge of the first ground electrode 42, thereby further increasing the match bandwidth. The second end 431 of the second ground electrode 43 of the first mode conversion component 4*a* extending into the waveguide chamber is a flush end, i.e., the end face of the second end 431 is parallel to the inner wall of the waveguide chamber 1.

The second mode conversion component 4*b* and the first mode conversion component 4*a* are symmetrical in structure. The second end 431 of the second ground electrode 43 of the second mode conversion component 4*b* extending into the waveguide chamber 1 is a flush end, i.e., the end face of the second end 431 is parallel to the inner wall of the waveguide chamber 1. The first end 421 of the first ground electrode 42 of the second mode conversion component 4*b* extending into the waveguide chamber 1 is a curved end, that is, the end face of the first end 421 is a curved surface, so as to improve the current path of the second ground electrode 43, thereby increasing the match bandwidth. Further, the side of the first end 421 away from the belt shaped line 41 protrudes toward the probe 3 compared with the side of the first end 421 close to the belt shaped line 41. Further, the second recess 432 is provided at the side of the second end 431 away from the belt shaped line 41, and the second recess 432 affects the electric field transmission, increases the length of the current path flowing to the edge, causes the current at the edge of the second ground electrode 43 to be reflected toward the belt shaped line 41 side, and reduces the current flowing to the edge of the first ground electrode 42, thereby further increasing the match bandwidth.

In some embodiments, for the first end 421 of the first ground electrode 42 of the first mode conversion component 4*a* extending into the waveguide transmission chamber 11, the outermost angle portion is a first inclined angle portion 423. for the second end 431 of the second ground electrode 43 of the second mode conversion component 4*b* extending into the waveguide transmission chamber 11, the outermost angle portion is a second inclined angle portion 433, and the first inclined angle portion 423 and the second inclined angle portion 433 can reduce current flowing to the edges, thereby increasing the match bandwidth.

As shown in FIG. 10, an isolation groove 44 is disposed between the first mode conversion component 4*a* and the second mode conversion component 4*b*. The isolation groove 44 is disposed between the second ground electrode 43 of the first mode conversion component 4*a* and the second ground electrode 43 of the second mode conversion component 4*b*, and the first mode conversion component 4*a* and the second mode conversion component 4*b* are isolated from each other by the isolation groove 44 between the second ground electrode 43 of the first mode conversion component 4*a* and the second ground electrode 43 of the second mode conversion component 4*b*, so as to reduce mutual influence between the first mode conversion component 4*a* and the second mode conversion component 4*b*.

Figure 11:
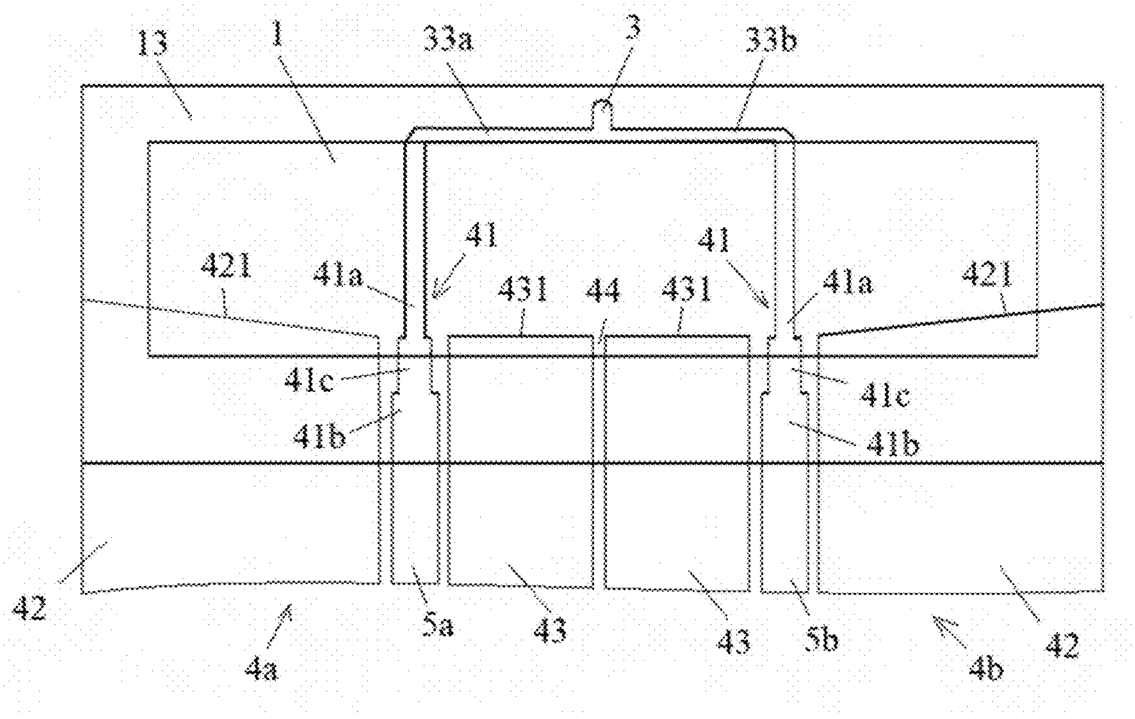
FIG. 11 is a top view of another waveguide conversion device according to an embodiment of the present disclosure.

As shown in FIG. 11, the waveguide conversion device includes a waveguide chamber 1, a substrate (not shown in the figure), one probe, and two mode conversion components. The waveguide chamber 1 includes a waveguide transmission chamber 11 and a waveguide back chamber (not shown in the figure) opposite to each other, and the substrate is arranged between the waveguide transmission chamber 11 and the waveguide back chamber and is configured to carry the probe and the mode conversion components.

The structure of the waveguide conversion device in the embodiment of the present disclosure is substantially similar to that of the waveguide conversion device shown in FIG. 9, only different parts are described below, and the description of the same parts is omitted.

In an embodiment of the present disclosure, only one probe 3 is provided, the probe 3 is connected to a first probe conductive line 33*a* and a second probe conductive line 33*b*, one end of the first probe conductive line 33*a* is connected to the probe 3, and the other end of the first probe conductive line 33*a* is connected to the belt shaped line 41 of a first mode conversion component 4*a*; one end of the second probe conductive line 33*b* is connected to the probe 3, and the other end of the second probe conductive line 33*b* is connected to the belt shaped line 41 of a second mode conversion component 4*b*.

In an embodiment of the present disclosure, the belt shaped line 41 of the first mode conversion component 4*a* includes a first belt shaped line segment 41*a*, a second belt shaped line segment 41*b*, and an intermediate belt shaped line segment 41*c*, a line width of the first belt shaped line segment 41*a* of the first mode conversion component 4*a* is the same as a line width of the first probe conductive line 33*a*, a line width of the second belt shaped line segment 41*b* of the first mode conversion component 4*a* is the same as a line width of the coplanar waveguide transmission line 5*a*, a line width of one end of the intermediate belt shaped line segment 41*c* is the same as the line width of the first belt shaped line segment 41*a*, and a line width of the other end of the intermediate belt shaped line segment 41*c* is the same as the line width of the second belt shaped line segment 41*b*.

The belt shaped line 41 of the second mode conversion component 4*b* includes a first belt shaped line segment 41*a*, a second belt shaped line segment 41*b*, and an intermediate belt shaped line segment 41*c*, a line width of the first belt shaped line segment 41*a* of the second mode conversion component 4*b* is the same as a line width of the first probe conductive line 33*a*, a line width of the second belt shaped line segment 41*b* of the second mode conversion component 4*b* is the same as a line width of the coplanar waveguide transmission line 5*b*, a line width of one end of the intermediate belt shaped line segment 41*c* is the same as the line width of the first belt shaped line segment 41*a*, and a line width of the other end of the intermediate belt shaped line segment 41*c* is the same as the line width of the second belt shaped line segment 41*b*.

The first end 421 of the first ground electrode 42 of the first mode conversion component 4*a* extending into the waveguide chamber 1 is an inclined end, that is, the end face of the first end 421 is an inclined surface, and a side of the first end 421 away from the belt shaped line 41 protrudes toward the probe 3 compared with a side of the first end 421 close to the belt shaped line 41. The second end 431 of the second ground electrode 43 of the first mode conversion component 4*a* extending into the waveguide chamber 1 is an aligned end, that is, the end face of the second end 431 is parallel to the inner wall of the waveguide chamber 1.

The second end 431 of the second ground electrode 43 of the second mode conversion component 4*b* extending into the waveguide chamber 1 is an aligned end, that is, the end face of the second end 431 is parallel to the inner wall of the waveguide chamber 1. The first end 421 of the first ground electrode 42 of the second mode conversion component 4*b* extending into the waveguide chamber 1 is an inclined end, that is, the end face of the first end 421 is an inclined surface, and a side of the first end 421 away from the belt shaped line 41 protrudes toward the probe 3 compared with a side of the first end 421 close to the belt shaped line 41.

Figure 12:
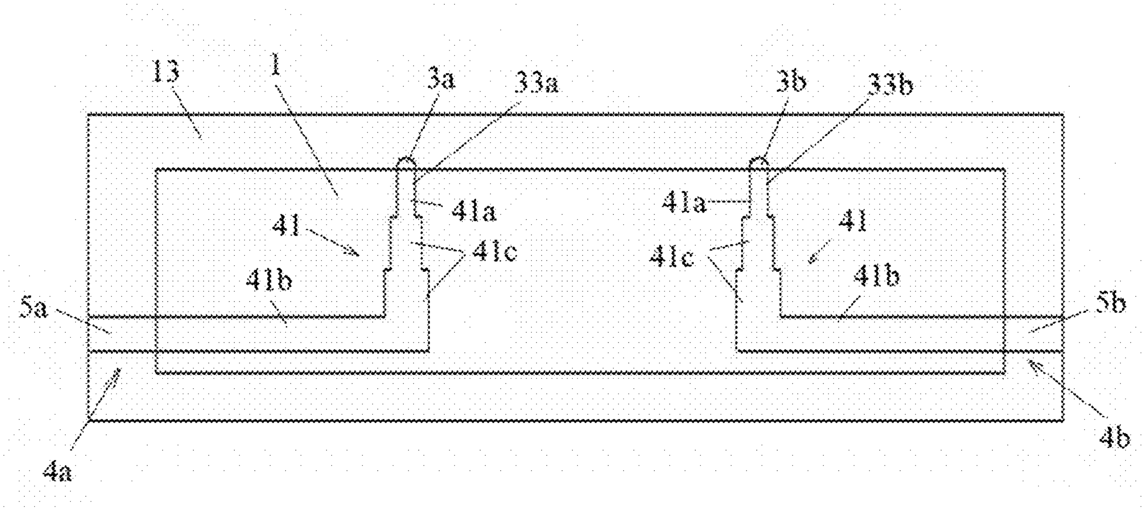
FIG. 12 is a top view of another waveguide conversion device according to an embodiment of the present disclosure.

As shown in FIG. 12, the waveguide conversion device includes a waveguide chamber 1, a substrate (not shown in the figure), two probes, and two mode conversion components. The waveguide chamber 1 includes a waveguide transmission chamber 11 and a waveguide back chamber (not shown in the figure) opposite to each other, and the substrate 2 is arranged between the waveguide transmission chamber and the waveguide back chamber and is configured to carry the probes 3 and the mode conversion components.

The structure of the waveguide conversion device in the embodiment of the present disclosure is substantially similar to that of the waveguide conversion device shown in FIG. 9, only different parts are described below, and the description of the same parts is omitted.

In an embodiment of the present disclosure, a first probe 3*a* and a second probe 3*b* are arranged in the waveguide chamber 1 and are spaced apart from each other, and the first probe 3*a* and the second probe 3*b* are oriented in the same direction. Furthermore, a first mode conversion component 4*a* and a second mode conversion component 4*b* are arranged on different sides of the waveguide chamber 1.

The belt shaped line 41 of the first mode conversion component 4*a* and the belt shaped line 41 of the second mode conversion component 4*b* are connected to the first coplanar waveguide transmission line 5*a* and the second coplanar waveguide transmission line 5*b*, respectively. The first coplanar waveguide transmission line 5*a* and the second coplanar waveguide transmission line 5*b* are arranged at two opposite sides of the waveguide chamber 1, that is, the first coplanar waveguide transmission line 5*a* and the second coplanar waveguide transmission line 5*b* extend into the waveguide chamber 1 from the two opposite sides of the waveguide chamber 1, respectively.

The belt shaped line 41 of the first mode conversion component 4*a* includes a first belt shaped line segment 41*a*, a second belt shaped line segment 41*b* and an intermediate belt shaped line segments 41*c*, a line width of the first belt shaped line segment 41*a* of the first mode conversion component 4*a* is the same as a line width of the first probe conductive line 33*a*, a line width of the second belt shaped line segment 41*b* of the first mode conversion component 4*a* is the same as a line width of the first coplanar waveguide transmission line 5*a*, and a line width of the intermediate belt shaped line segment 41*c* varies step by step to adapt to the line width of the first probe conductive line 33*a* and the line width of the first coplanar waveguide transmission line 5*a*.

In an embodiment of the present disclosure, the second belt shaped line segment 41*b* of the first mode conversion component 4*a* is a bent belt shaped line segment, and the axes of the first probe 3*a* and the first coplanar waveguide transmission line 5*a* intersect with each other.

The structure of the belt shaped line 41 of the second mode conversion component 4*b* is substantially the same as that of the belt shaped line 41 of the first mode conversion component 4*a*, the second belt shaped line segment 41*b* of the second mode conversion component 4*b* is a bent belt shaped line segment, and the axis of the second probe 3*b* intersects with the axis of the second coplanar waveguide transmission line 5*b*.

It should be noted that although the waveguide conversion device shown in FIG. 12 only shows the waveguide chamber 1, the probes 3 and the belt shaped lines 41, and does not show the first ground electrode and the second ground electrode, this does not mean that the first ground electrode and the second ground electrode are not included in the embodiment.

Figure 13:
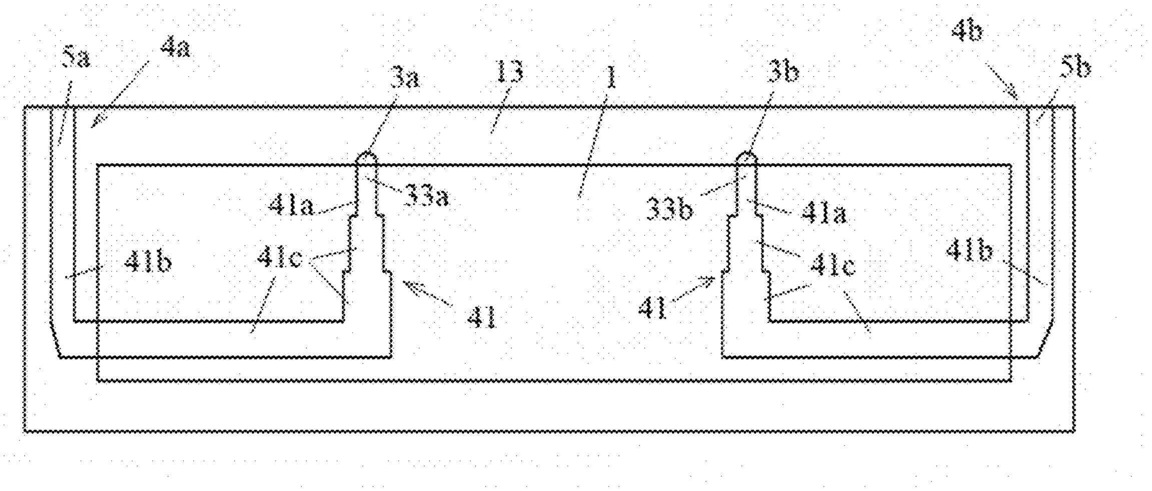
FIG. 13 is a top view of another waveguide conversion device according to an embodiment of the present disclosure.

As shown in FIG. 13, the waveguide conversion device includes a waveguide chamber 1, a substrate (not shown in the figure), two probes, and two mode conversion components. The waveguide chamber 1 includes a waveguide transmission chamber 11 and a waveguide back chamber (not shown in the figure) opposite to each other, and the substrate is arranged between the waveguide transmission chamber 11 and the waveguide back chamber (not shown in the figure), and is configured to carry the probes and the mode conversion components.

The structure of the waveguide conversion device in the embodiment of the present disclosure is substantially similar to that of the waveguide conversion device shown in FIG. 12, only different parts are described below, and the description of the same parts is omitted.

In an embodiment of the present disclosure, a first probe 3*a* and a second probe 3*b* are arranged in the waveguide chamber 1 at an interval, and the first probe 3*a* and the second probe 3*b* are oriented in the same direction. Furthermore, the first mode conversion component 4*a* and the second mode conversion component 4*b* are arranged on the same side of the waveguide chamber 1.

The belt shaped line 41 of the first mode conversion component 4*a* and the belt shaped line 41 of the second mode conversion component 4*b* are connected to the first coplanar waveguide transmission line 5*a* and the second coplanar waveguide transmission line 5*b*, respectively. The first coplanar waveguide transmission line 5*a* and the second coplanar waveguide transmission line 5*b* are arranged at two opposite sides of the waveguide chamber 1, that is, the first coplanar waveguide transmission line 5*a* and the second coplanar waveguide transmission line 5*b* extend into the waveguide chamber 1 from the two opposite sides of the waveguide chamber 1.

The belt shaped line 41 of the first mode conversion component 4*a* includes five belt shaped line segments, a line width of the first belt shaped line segment 41*a* is the same as a line width of the first probe conductive line 33*a*, a line width of the second belt shaped line segment 41*b* of the first mode conversion component 4*a* is the same as a line width of the first coplanar waveguide transmission line 5*a*, and line widths of three intermediate belt shaped line segments 41*c* between the first belt shaped line segment 41*a* and the second belt shaped line segment 41*b* vary step by step.

In an embodiment of the present disclosure, the axis of the first probe 3*a* is parallel to the axis of the first coplanar waveguide transmission line 5*a*, and accordingly, the intermediate belt shaped line segment 41*c* of the first mode conversion component 4*a* is set to be in a bent manner. It should be noted that the position at which the belt shaped line 41 of the first mode conversion component 4*a* is bent may be any position of the intermediate belt shaped line segment 41*c*, and is not limited in the present disclosure.

The structure of the belt shaped line 41 of the second mode conversion component 4*b* is substantially the same as the belt shaped line 41 of the first mode conversion component 4*a*, and is not repeatedly described here.

It should be noted that although FIG. 13 only shows that the waveguide conversion device includes the waveguide chamber 1, the probes 3 and the belt shaped lines 41, and does not show the first ground electrode and the second ground electrode, this does not mean that the first ground electrode and the second ground electrode are not included in the embodiment.

Figure 14:
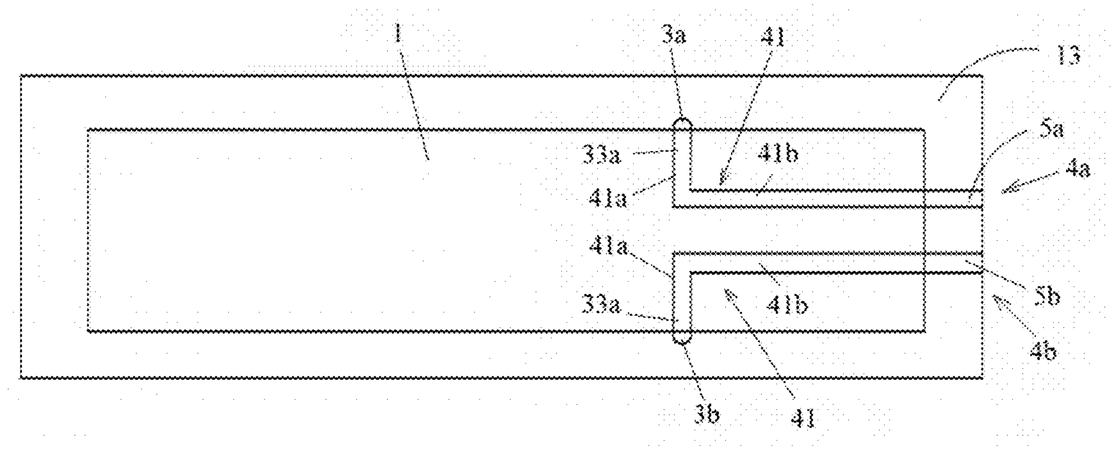
FIG. 14 is a top view of another waveguide conversion device according to an embodiment of the present disclosure.

As shown in FIG. 14, the waveguide conversion device includes a waveguide chamber 1, a substrate (not shown in the figure), two probes, and two mode conversion components. The waveguide chamber 1 includes a waveguide transmission chamber 11 and a waveguide back chamber (not shown in the figure) opposite to each other, and the substrate is arranged between the waveguide transmission chamber 11 and the waveguide back chamber (not shown in the figure), and is configured to carry the probes and the mode conversion components.

The structure of the waveguide conversion device in the embodiment of the present disclosure is substantially similar to that of the waveguide conversion device shown in FIG. 12, only different parts are described below, and the description of the same parts is omitted.

In an embodiment of the present disclosure, the first probe 3*a* and the second probe 3*b* are arranged in the waveguide chamber 1 at an interval, and the first probe 3*a* and the second probe 3*b* are oppositely oriented. Furthermore, the first mode conversion component 4*a* and the second mode conversion component 4*b* are arranged on the same side of the waveguide chamber 1.

The belt shaped line 41 of the first mode conversion component 4*a* and the belt shaped line 41 of the second mode conversion component 4*b* are connected to the first coplanar waveguide transmission line 5*a* and the second coplanar waveguide transmission line 5*b*, respectively. The first coplanar waveguide transmission line 5*a* and the second coplanar waveguide transmission line 5*b* are arranged on the same side of the waveguide chamber 1.

The belt shaped line 41 of the first mode conversion component 4*a* includes two belt shaped line segments, i.e., a first belt shaped line segment 41*a* and a second belt shaped line segment 41*b*, a line width of the first belt shaped line segment 41*a* is the same as a line width of the first probe conductive line 33*a*, and a line width of the second belt shaped line segment 41*b* is the same as a line width of the first coplanar waveguide transmission line 5*a*.

In an embodiment of the present disclosure, the first belt shaped line segment 41*a* and the second belt shaped line segment 41*b* in the first mode conversion component 4*a* are perpendicular to each other, so that the axis of the first probe 3*a* and the axis of the first coplanar waveguide transmission line 5*a* are perpendicular to each other.

The structure of the belt shaped line 41 of the second mode conversion component 4*b* is substantially the same as that of the belt shaped line 41 of the first mode conversion component 4*a*, and is not repeatedly described here.

It should be noted that although FIG. 14 only shows that the waveguide conversion device includes the waveguide chamber 1, the probes 3 and the belt shaped lines 41, and does not show the first ground electrode and the second ground electrode, this does not mean that the first ground electrode and the second ground electrode are not included in the embodiment.

Figure 15:
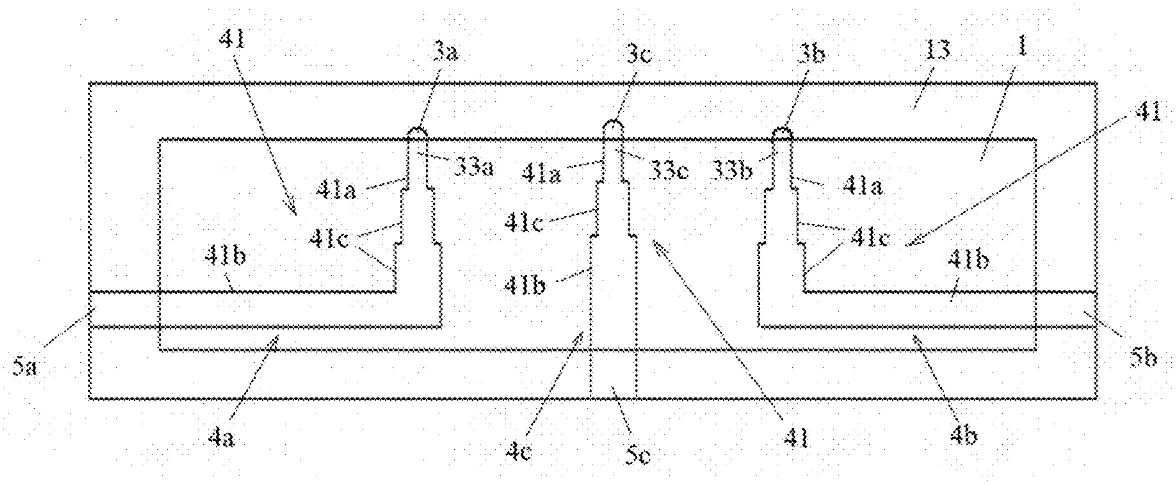
FIG. 15 is a top view of another waveguide conversion device according to an embodiment of the present disclosure.

As shown in FIG. 15, the waveguide conversion device includes a waveguide chamber 1, a substrate (not shown in the figure), three probes, and three mode conversion components. The waveguide chamber 1 includes a waveguide transmission chamber 11 and a waveguide back chamber (not shown in the figure) opposite to each other, and the substrate is arranged between the waveguide transmission chamber 11 and the waveguide back chamber (not shown in the figure), and is configured to carry the probes and the mode conversion components.

The structure of the waveguide conversion device in the embodiment of the present disclosure is substantially similar to that of the waveguide conversion device shown in FIG. 14, only different parts are described below, and the description of the same parts is omitted.

In an embodiment of the present disclosure, the first probe 3*a*, the second probe 3*b* and the third probe 3*c* are arranged in the waveguide chamber 1 at intervals, and the first probe 3*a*, the second probe 3*b* and the third probe 3*c* are oriented in the same direction. Furthermore, the first mode conversion component 4*a*, the second mode conversion component 4*b* and the third mode conversion component 4*c* are arranged on different sides of the waveguide chamber 1.

The belt shaped line 41 of the first mode conversion component 4*a* includes four belt shaped line segments, namely, a first belt shaped line segment 41*a*, a second belt shaped line segment 41*b*, and intermediate belt shaped line segments 41*c*, a line width of the first belt shaped line segment 41*a* is the same as a line width of the first probe conductive line 33*a*, and a line width of the second belt shaped line segment 41*b* is the same as a line width of the first coplanar waveguide transmission line 5*a*. Line widths of the intermediate belt shaped line segments 41*c* vary step by step to adapt to the line width of the first probe conductive line 33*a* and the line width of the first coplanar waveguide transmission line 5*a*.

The structure of the belt shaped line 41 of the second mode conversion component 4*a* is substantially the same as that of the belt shaped line 41 of the first mode conversion component 4*a*, and is not repeatedly described here.

The belt shaped line 41 of the third mode conversion component 4*c* includes three belt shaped line segments, namely, a first belt shaped line segment 41*a*, a second belt shaped line segment 41*b*, and an intermediate belt shaped line segment 41*c*, a line width of the first belt shaped line segment 41*a* is the same as a line width of the third probe conductive line 33*c*, and a line width of the second belt shaped line segment 41*b* is the same as a line width of the third coplanar waveguide transmission line 5*c*. A line width of the intermediate belt shaped line segment 41*c* varies step by step to adapt to the line width of the third probe conductive line 33*c* and the line width of the third coplanar waveguide transmission line 5*c*.

It should be noted that although FIG. 15 only shows that the waveguide conversion device includes the waveguide chamber 1, the probes and the belt shaped lines, and does not show the first ground electrode and the second ground electrode, this does not mean that the first ground electrode and the second ground electrode are not included in the embodiment.

Figure 16:
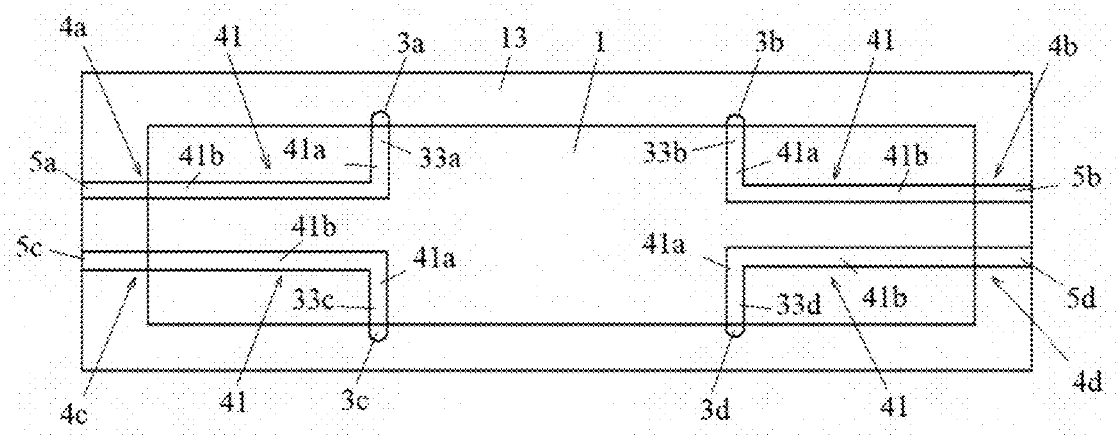
FIG. 16 is a top view of another waveguide conversion device according to an embodiment of the present disclosure.

As shown in FIG. 16, the waveguide conversion device includes a waveguide chamber 1, a substrate (not shown in the figure), four probes, and four mode conversion components. The waveguide chamber 1 includes a waveguide transmission chamber 11 and a waveguide back chamber (not shown in the figure) opposite to each other, and the substrate is arranged between the waveguide transmission chamber 11 and the waveguide back chamber (not shown in the figure) and is configured to carry the probes and the mode conversion components.

In an embodiment of the present disclosure, the first probe 3*a*, the second probe 3*b*, the third probe 3*c* and the fourth probe 3*d* are arranged in the waveguide chamber 1 at intervals, the first probe 3*a* and the second probe 3*b* are oriented in the same direction, the third probe 3*c* and the fourth probe 3*d* are oriented in the same direction, but the first probe 3*a* and the third probe 3*c* are oriented in opposite directions. Furthermore, the first mode conversion component 4*a* and the third mode conversion component 4*c* are arranged on the same side of the waveguide chamber 1, and the second mode conversion component 4*b* and the fourth mode conversion component 4*d* are arranged on the same side of the waveguide chamber 1, but the first mode conversion component 4*a* and the second mode conversion component 4*b* are arranged on different sides of the waveguide chamber 1.

The belt shaped lines 41 of the first mode conversion component 4*a*, the second mode conversion component 4*b*, the third mode conversion component 4*c* and the fourth mode conversion component 4*d* each include two belt shaped line segments, namely, a first belt shaped line segment 41*a* and a second belt shaped line segment 41*b*. In addition, the axes of the first belt shaped line segment 41*a* and the second belt shaped line segment 41*b* intersect, e.g., the first belt shaped line segment 41*a* and the second belt shaped line segment 41*b* are perpendicular. A line width of the first belt shaped line segment 41*a* is the same as a line width of the first probe conductive line 33*a*, and a line width of the second belt shaped line segment 41*b* is the same as a line width of the first coplanar waveguide transmission line 5*a*.

It should be noted that, the belt shaped lines 41 of the first mode conversion component 4*a*, the second mode conversion component 4*b*, the third mode conversion component 4*c*, and the fourth mode conversion component 4*d* each may further include an intermediate belt shaped line segment, and transition from the line width of the first belt shaped line segment 41*a* to the line width of the second belt shaped line segment 41*b* can be achieved step by step or smoothly by adjusting the line width of the intermediate belt shaped line segment.

It should be noted that although FIG. 16 only shows that the waveguide conversion device includes the waveguide chamber 1, the probes 3 and the belt shaped lines 41, and does not show the first ground electrode and the second ground electrode, this does not mean that the first ground electrode and the second ground electrode are not included in the embodiment.

Figure 17:
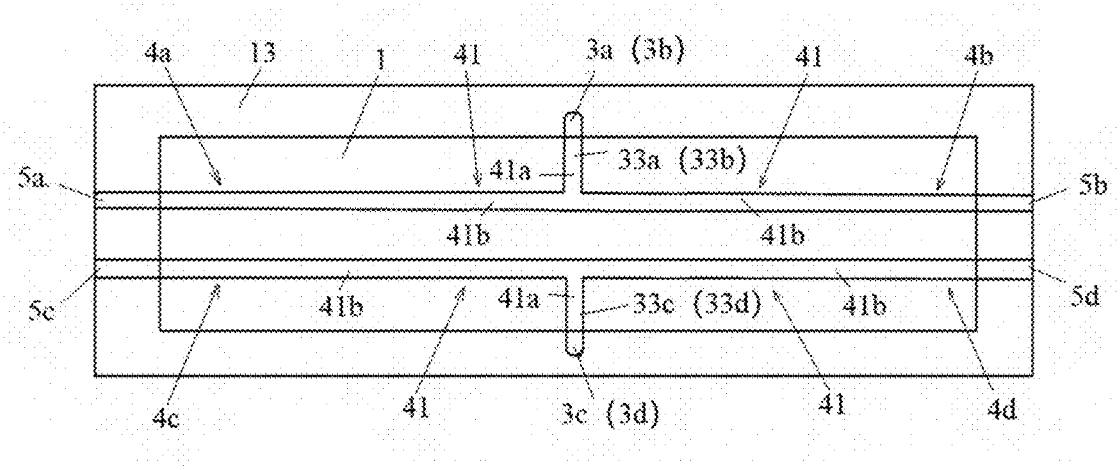
FIG. 17 is a top view of another waveguide conversion device according to an embodiment of the present disclosure.

As shown in FIG. 17, the waveguide conversion device includes a waveguide chamber 1, a substrate (not shown in the figure), four probes 3, and four mode conversion components 4. The waveguide chamber 1 includes a waveguide transmission chamber 11 and a waveguide back chamber (not shown in the figure) opposite to each other, and the substrate is arranged between the waveguide transmission chamber 11 and the waveguide back chamber (not shown in the figure) and is configured to carry the probes 3 and the mode conversion components 4.

In an embodiment of the present disclosure, the first probe 3*a*, the second probe 3*b*, the third probe 3*c* and the fourth probe 3*d* are arranged in the waveguide chamber 1 at intervals, the first probe 3*a* and the second probe 3*b* are oriented in the same direction, the third probe 3*c* and the fourth probe 3*d* are oriented in the same direction, but the first probe 3*a* and the third probe 3*c* are oriented in opposite directions. Furthermore, the first mode conversion component 4*a* and the third mode conversion component 4*c* are arranged on the same side of the waveguide chamber 1, the second mode conversion component 4*b* and the fourth mode conversion component 4*d* are arranged on the same side of the waveguide chamber 1, but the first mode conversion component 4*a* and the second mode conversion component 4*b* are arranged on different sides of the waveguide chamber 1.

In an embodiment of the present disclosure, the first probe 3*a* and the second probe 3*b* are stacked, the third probe 3*c* and the fourth probe 3*d* are stacked, and other structures of the waveguide conversion device according to the embodiment are the same as those of the waveguide conversion device shown in FIG. 16, and are not repeatedly described here.

In some embodiments, the first probe 3*a* and the second probe 3*b* may be arranged in a crossing manner, for example, by extending the probe conductive line or the belt shaped line corresponding to the first probe 3*a*, or extending the probe conductive line or the belt shaped line corresponding to the second probe 3*b*, or extending the probe conductive line or the belt shaped line corresponding to the first probe 3*a* while extending the probe conductive line or the belt shaped line corresponding to the second probe 3*b*.

Figure 18:
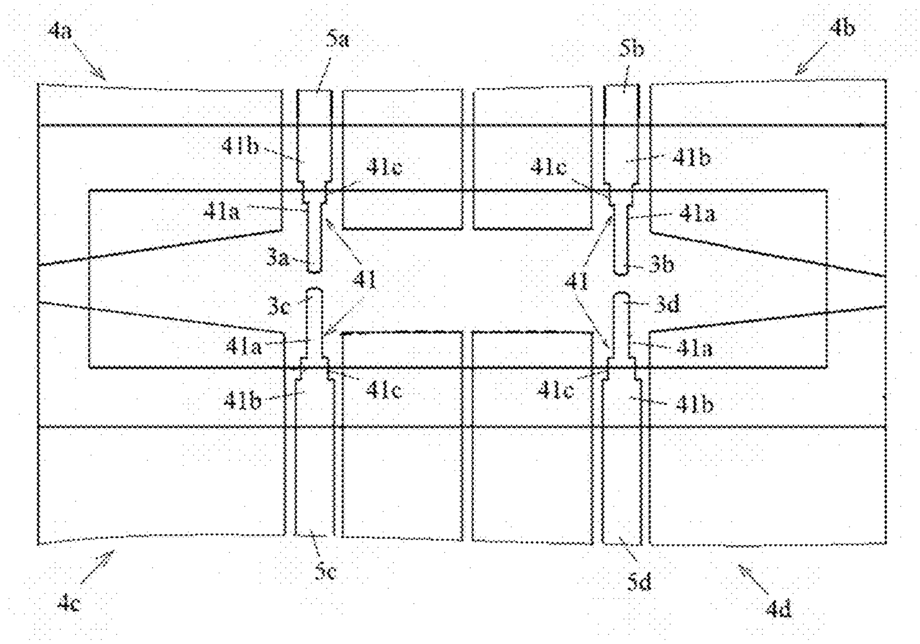
FIG. 18 is a top view of a waveguide conversion device according to an embodiment of the present disclosure.

As shown in FIG. 18, the waveguide conversion device includes a waveguide chamber 1, a substrate (not shown in the figure), four probes 3, and four mode conversion components. The waveguide chamber 1 includes a waveguide transmission chamber 11 and a waveguide back chamber (not shown in the figure) opposite to each other, and the substrate is arranged between the waveguide transmission chamber 11 and the waveguide back chamber (not shown in the figure), and is configured to carry the probes and the mode conversion components.

In an embodiment of the present disclosure, a first probe 3*a*, a second probe 3*b*, a third probe 3*c* and a fourth probe 3*d* are arranged in the waveguide chamber 1 at intervals, the first probe 3*a* and the second probe 3*b* are oriented in the same direction, the third probe 3*c* and the fourth probe 3*d* are oriented in the same direction, but the first probe 3*a* and the third probe 3*c* are oriented in opposite directions. Furthermore, the first mode conversion component 4*a* and the third mode conversion component 4*c* are disposed at an interval on the same side of the waveguide chamber 1, the second mode conversion component 4*b* and the fourth mode conversion component 4*d* are disposed at an interval on the same side of the waveguide chamber 1, but the first mode conversion component 4*a* and the second mode conversion component 4*b* are disposed on opposite sides of the waveguide chamber 1.

In an embodiment of the present disclosure, the belt shaped line 41 includes three belt shaped line segments, namely, a first belt shaped line segment 41*a*, a second belt shaped line segment 41*b*, and an intermediate belt shaped line segment 41*c*, a line width of the first belt shaped line segment 41*a* is the same as a line width of the first probe conductive line 33*a*, and a line width of the second belt shaped line segment 41*b* is the same as a line width of the first coplanar waveguide transmission line 5*a*. A line width of the intermediate belt shaped line segment 41*c* varies step by step to adapt to the line width of the first probe conductive line 33*a* and the line width of the first coplanar waveguide transmission line 5*a*.

It should be noted that the waveguide conversion devices shown in FIGS. 10 to 18 are one-to-many conversion devices from waveguide to waveguide transmission line, the number and arrangement of the probes and the mode conversion components are mainly introduced, the structure and specific arrangement of the probes and the mode conversion components may adopt any one of the configurations shown in FIGS. 1 to 9, and the detail description thereof is not given in consideration of the length of the present disclosure.

It should be noted that the waveguide conversion devices shown in FIGS. 10 to 18 realize one-to-many waveguide conversion. In addition, the mode conversion components are arranged at intervals on the same side or different sides of the waveguide chamber 1, and the probes are flexibly oriented, so that the size of the wavefront can be reduced, and the cost can be reduced.

Figure 19:
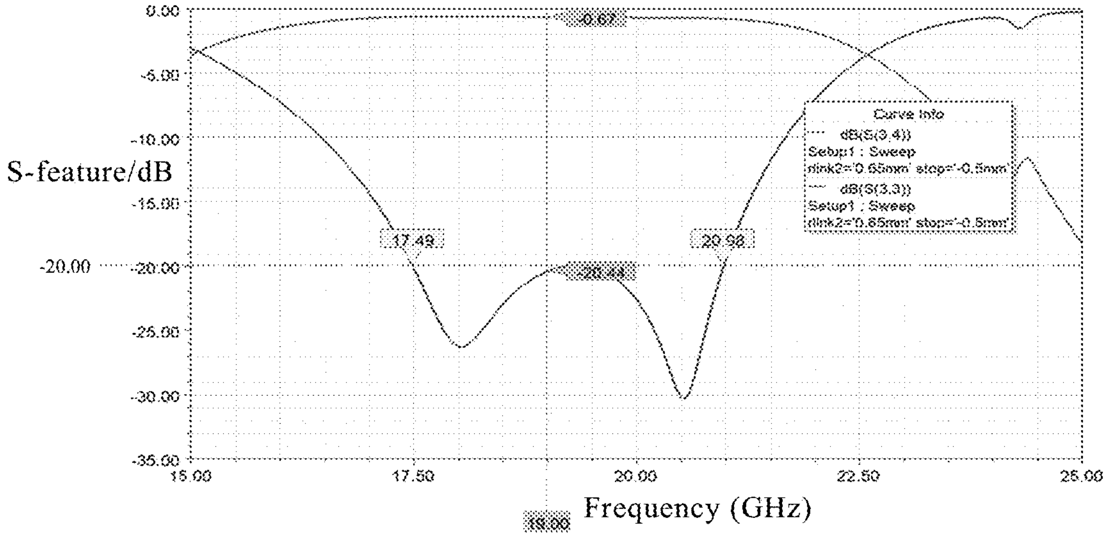
FIG. 19 is a graph illustrating simulation effect of S-feature of a one-to-one waveguide conversion device according to an embodiment of the present disclosure.
Figure 20:
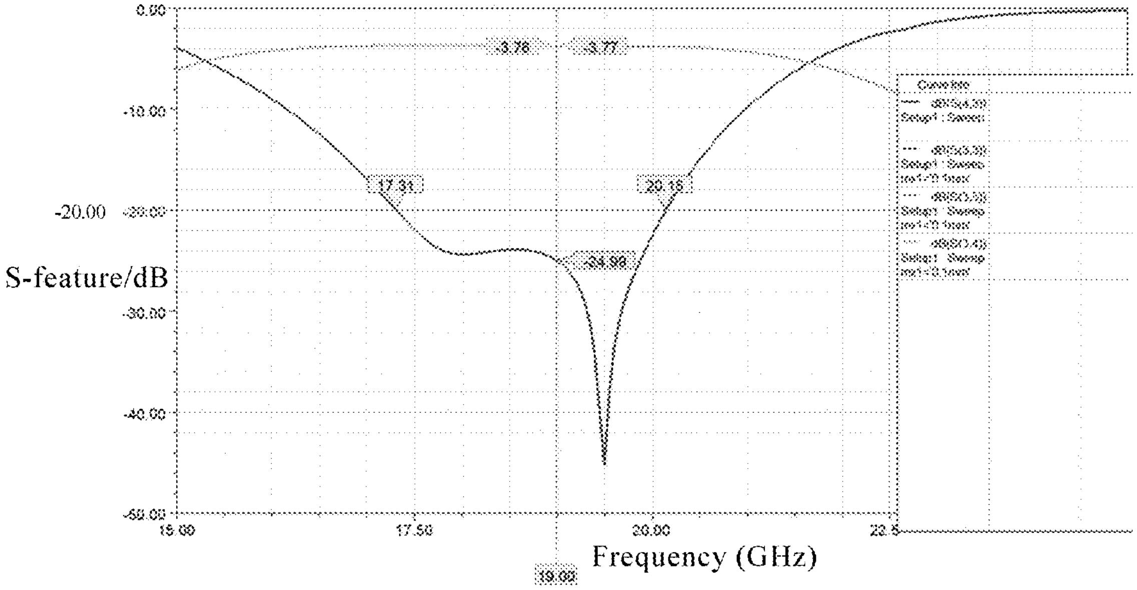
FIG. 20 is a graph illustrating simulation effect of S-feature of a one-to-many waveguide conversion device according to an embodiment of the present disclosure.

FIGS. 19 and 20 are graphs illustrating simulation effect of S-feature of the waveguide conversion device according to an embodiment of the present disclosure. The abscissa represents frequency in GHz; and the ordinate represents loss value in dB.

FIG. 19 is a graph illustrating simulation effect of S-feature of a one-to-one waveguide to coplanar waveguide transmission line. As can be seen from FIG. 19, in a frequency range of 17.49 GHz to 20.98 GHz, the insertion loss is less than −0.67 dB; the return loss is less than −20.44 dB.

FIG. 20 is a graph illustrating simulation effect of S-feature of a one-to-two waveguide to coplanar waveguide transmission line. As can be seen from FIG. 20, in a frequency range of 17.31 GHz to 20.15, the insertion loss is less than −0.76 dB; the return loss is less than −24.99 dB.

As can be seen from FIGS. 19 and 20, the waveguide conversion devices according to the embodiments of the present disclosure have a small waveguide transmission loss in a relatively wide frequency band, so that low-loss conversion can be achieved.

An embodiment of the disclosure further provides an electronic apparatus, which includes a waveguide conversion device, the waveguide conversion device adopts the waveguide conversion device according to any one of the embodiments of the present disclosure, so that impedance match and mode match are realized, and low loss is realized in a relatively wide frequency band range.

It should be noted that, herein, the term "including," "comprising," or any other variation thereof, is intended to cover a non-exclusive inclusion, so that a process, method, article, or device that includes a list of elements does not include only those elements but may include other elements not expressly listed or inherent to such process, method, article, or device. Without further limitation, an element identified by the phrase "including a . . . " does not exclude the presence of other identical elements in the process, method, article, or device that includes the element.

It is to be understood that the above embodiments are merely exemplary embodiments adopted to illustrate the principles of the present disclosure/utility model, but the present disclosure/utility model is not limited thereto. It will be apparent to those skilled in the art that various modifications and improvements can be made without departing from the spirit and scope of the disclosure/utility model, and such modifications and improvements are also considered to be within the scope of the disclosure/utility model.

What is claimed is:

1. A waveguide conversion device, comprising:

a waveguide chamber comprising a waveguide transmission chamber and a waveguide back chamber opposite to each other;

a substrate between the waveguide transmission chamber and the waveguide back chamber, the substrate at least comprising a dielectric substrate;

a probe in the waveguide chamber and connected to a probe conductive line; and a mode conversion component on the dielectric substrate and comprising a belt shaped line, a first ground electrode and a second ground electrode, wherein the probe, the probe conductive line and the belt shaped line are connected in sequence, and the probe and the probe conductive line extend into the waveguide transmission chamber, wherein the belt shaped line is between and spaced apart from the first ground electrode and the second ground electrode, one end of the belt shaped line is connected to the probe conductive line, and the other end of the belt shaped line is connected to a coplanar waveguide transmission line, wherein the probe comprises a probe body and a deformation mechanism at an end of the probe body, and the probe body is configured to change a path of current in the probe, wherein the deformation mechanism comprises a plurality of through holes arranged at intervals along a length direction of the probe, and each through hole penetrates through the probe body in a thickness direction of the probe body, wherein an end of each of the first ground electrode and the second ground electrode extending into the waveguide transmission chamber is provided with a recess, which opens toward the waveguide transmission chamber and located at a position of the end away from the belt shaped line.

2. The waveguide conversion device of claim 1, wherein the waveguide conversion device comprises n mode conversion components, n being an integer greater than or equal to 2, wherein the belt shaped lines of the n mode conversion components are on a same side of the waveguide chamber, and the probes are oriented in a same direction or different directions, or the belt shaped lines of the n mode conversion components are on different sides of the waveguide chamber, and the probes are oriented in a same direction or different directions.

3. The waveguide conversion device of claim 2, wherein the probes corresponding to the n mode conversion components are spaced apart, stacked or crossed; or ends of the probes corresponding to the n mode conversion components are connected.

4. The waveguide conversion device of claim 2, wherein the n mode conversion components are isolated from each other, and an isolation groove is provided between two adjacent mode conversion components.

5. The waveguide conversion device of claim 1, wherein the probe conductive line and the coplanar waveguide transmission line have different line widths; and the belt shaped line comprises at least two belt shaped line segments connected in sequence, and the at least two belt shaped line segments connected in sequence have different line widths.

6. The waveguide conversion device of claim 5, wherein the belt shaped line comprises a first belt shaped line segment, a second belt shaped line segment and an intermediate belt shaped line segment between the first belt shaped line segment and the second belt shaped line segment, and the intermediate belt shaped line segment has a line width transitioned smoothly or step by step from a width of the first belt shaped line segment to a width of the second belt shaped line segment.

7. The waveguide conversion device of claim 1, wherein ends of the first ground electrode and the second ground electrode extending into the waveguide transmission chamber are both inclined ends, and a side of the inclined end away from the belt shaped line protrudes toward the probe compared with a side of the inclined end close to the belt shaped line.

8. The waveguide conversion device of claim 7, wherein an angle portion, on the side away from the belt shaped line, of the end of each of the first ground electrode and the second ground electrode extending into the waveguide transmission chamber and is an inclined angle portion.

9. The waveguide conversion device of claim 1, wherein a position at which the coplanar waveguide transmission line is connected to the belt shaped line overlaps with a waveguide wall of the waveguide chamber.

10. The waveguide conversion device of claim 1, wherein an end of the probe is in the waveguide chamber; or, the end of the probe overlaps with the waveguide wall of the waveguide chamber.

11. The waveguide conversion device of claim 1, wherein the probe comprises a plurality of sub-probes connected in sequence along an axis of the probe.

12. The waveguide conversion device of claim 1, wherein ends of the first ground electrode and the second ground electrode extending into the waveguide transmission chamber are flush ends.

13. The waveguide conversion device of claim 1, wherein the substrate further comprises a first substrate between the waveguide transmission chamber and the dielectric substrate and a second substrate between the dielectric substrate and the waveguide back chamber; and the first ground electrode and the second ground electrode are both between the dielectric substrate and the first substrate; or the first ground electrode and the second ground electrode are both between the dielectric substrate and the second substrate; or the first ground electrode is between the dielectric substrate and the first substrate, and the second ground electrode is between the dielectric substrate and the second substrate.

14. The waveguide conversion device of claim 1, wherein a height of the waveguide back chamber is 1 to 2 times a length of the probe.

15. The waveguide conversion device of claim 1, further comprising a waveguide ridge at a bottom of the waveguide back chamber.

16. The waveguide conversion device of claim 1, wherein the waveguide chamber is any one of a rectangular waveguide, a circular waveguide, an elliptical waveguide and a ridge waveguide.

17. An electronic apparatus, comprising the waveguide conversion device of claim 1.

* * * * *